(12) United States Patent
Hayashi et al.

(10) Patent No.: US 6,599,954 B1
(45) Date of Patent: Jul. 29, 2003

(54) RESIN CURING METHOD ENABLING THE ENERGY RADIATION CURING OF RESINS CONTAINING AN ENERGY RADIATION SCREENING SUBSTANCE, COMPOSITIONS, MOLDED ARTICLES AND MOLDED METHODS

(75) Inventors: Noriya Hayashi, Nagoya (JP); Shunichi Hayashi, Nagoya (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/331,334

(22) PCT Filed: Oct. 15, 1998

(86) PCT No.: PCT/JP98/04660

§ 371 (c)(1), (2), (4) Date: Jun. 17, 1999

(87) PCT Pub. No.: WO99/20674

PCT Pub. Date: Apr. 29, 1999

(30) Foreign Application Priority Data

Oct. 17, 1997 (JP) ............................................... 9-285295
Oct. 6, 1998 (JP) ............................................ 10-283867

(51) Int. Cl.⁷ ........................... C08K 3/02; C08K 3/00; C08J 3/28; C08G 59/00
(52) U.S. Cl. ............................. 522/25; 522/26; 522/28; 522/31; 522/71; 522/81; 522/83; 522/170; 442/149; 442/150; 442/409; 156/272.3; 156/273.3; 156/273.5; 156/275.5; 156/307.1; 156/307.3
(58) Field of Search .............................. 522/25, 31, 28, 522/71, 81, 83, 170, 26; 442/149, 150, 409; 156/272.2, 273.3, 273.5, 275.5, 307.1, 307.3

(56) References Cited

U.S. PATENT DOCUMENTS

| | | | |
|---|---|---|---|
| 4,058,401 A | * | 11/1977 | Crivello |
| 4,173,476 A | * | 11/1979 | Smith et al. |
| 4,222,835 A | * | 9/1980 | Dixon |
| 4,252,592 A | * | 2/1981 | Green |
| 4,308,118 A | * | 12/1981 | Dudgeon |
| 4,351,708 A | * | 9/1982 | Berner et al. |
| 4,374,066 A | * | 2/1983 | Crivello et al. |
| 4,468,485 A | | 8/1984 | Gourdenne et al. |
| 5,242,715 A | | 9/1993 | Schoen et al. ............ 427/386 |
| 5,247,113 A | * | 9/1993 | Roth et al. |
| 5,252,631 A | | 10/1993 | Owens |
| 5,726,216 A | * | 3/1998 | Janke et al. |
| 5,730,764 A | * | 3/1998 | Williamson et al. |
| 5,747,599 A | * | 5/1998 | Ohnishi |
| 5,798,396 A | * | 8/1998 | Takahashi et al. |

FOREIGN PATENT DOCUMENTS

| | | | |
|---|---|---|---|
| GB | 2 108 509 A | 11/1981 | |
| JP | 57208210 A | 12/1982 | ........... B29D/3/02 |
| JP | 61012725 A | 1/1986 | ........... C08G/59/68 |
| JP | 06-157624 | 6/1994 | ........... C08F/4/00 |
| JP | 07-082283 | 3/1995 | ........... C07F/9/54 |
| JP | 7-179572 A | 7/1995 | ........... C08G/59/68 |
| JP | 08283388 | 10/1996 | ........... C08G/59/68 |
| JP | 10024496 A | 1/1998 | ........... B29C/70/06 |
| WO | WO 94/21455 | 9/1994 | ........... B32B/17/02 |

OTHER PUBLICATIONS

Hamazu et al.; "Novel Benzyl Sulfonium Salt Having an Aromatic Group on Sulfur Atom as a Latent Thermal Initiator," *Journal of Polymer Science: Part A: Polymer Chemistry* 29 1675–1680 (1991).
Partial Translation of "Kobunshi" 40 794–797 (1991).
Partial translation of "Insulation Varnish," U. Aimono, T. Sugie and H. Nishigaki, Kogyo Zairyo, 29: 33–37 (1981).
Partial Translation of Optimer KS series resin (Ashai Denka Kogyo K.K.).
Partial translation of "Features and application of Liquid Resin for Electronic Parts in Combination of UV and Heat," J. Sakamoto and H. Fujimoto, Denshi Zairyo, pp. 110–116, (Dec. 1987).
Database WPI Week 9702 Derwent Publications Ltd., London, GB AN 1997–017444 XP002213101 & JP 08 283388A.

* cited by examiner

*Primary Examiner*—Susan W. Berman
(74) *Attorney, Agent, or Firm*—Myers Bigel Sibley & Sajovec

(57) ABSTRACT

An object of the present invention is to completely cure a resin composition highly capable of screening energy radiation, such as a carbon fiber-reinforced composite material (CFRP), simply by exposing the resin composition to UV radiation in the presence of a specific photopolymerization initiator system (reaction catalyst system) comprising at least two components. To this end, the present invention provides a resin curing method wherein, when a resin composition is exposed to energy radiation typified by UV radiation, another kind of first energy than the energy from an energy radiation source is autogenously generated within the resin, and the same kind of second energy is successively generated by the autogenously generated energy, so that the resin composition is cured by means of the first and second energies, or both the first and second energies and the energy from the energy radiation source, whether or not the resin composition contains a substance capable of screening energy radiation.

80 Claims, 11 Drawing Sheets

(a)

☒ : Resin composition (liquid)
☒ : UV-cured resin
■ : UV energy (light and shade indicate differences in intensity)

(b)

☒ : Resin composition (liquid)
☒ : Carbon cloth material
■ : UV energy (light and shade indicate differences in intensity)
☒ : UV-cured resin ② Drawing process ③ Filament/tape/roll winding process ④ Continuous roll pressing process

RESIN CURING METHOD ENABLING THE ENERGY RADIATION CURING OF RESINS CONTAINING AN ENERGY RADIATION SCREENING SUBSTANCE, COMPOSITIONS, MOLDED ARTICLES AND MOLDED METHODS

TECHNICAL FIELD

The present invention relates to a resin curing method for curing resins rapidly by means of energy radiation such as ultraviolet radiation (UV), electron beam (EB), infrared radiation, X-rays, visible light, light from lasers (e.g., argon, $CO_2$ and excimer lasers), sunlight and radiated heat rays, and other energy such as heat, and to polymerization initiators and compositions which enable resins to be cured by this method, molded articles made therefrom, and their production methods and apparatus.

More particularly, the present invention relates to a resin curing method for thick-walled resins in which energy radiation is attenuated or absorbed by the resin to cause a marked reduction in curing action and, therefore, the deep part thereof cannot be cured, and for resins reinforced with fillers (e.g., carbon fiber, metallic fibers and glass fiber) or metallic inserts in which energy radiation is screened by such reinforcing materials and, therefore, the shaded part of the resin cannot be completely cured, and to polymerization initiators and compositions which enable such resins to be cured by this method, molded articles made therefrom, and their production methods and apparatus.

The present invention also relates to a novel resin curing method which enables the energy radiation curing of resin systems containing substances highly capable of screening radiation energy (e.g., carbon, carbon fiber (CF), metals and other inorganic fillers), such as carbon fiber-reinforced composite materials (CFRPS) and carbon/metal/inorganic matter-containing resins, and to compositions therefor, molded articles made therefrom, and their production methods.

The present invention also relates to a method of making a fiber-reinforced composite material (FRP) wherein a composition capable of inducing the novel resin curing mechanism in the aforesaid resin curing method is used as the matrix resin, and a reinforcing fiber (e.g., CF) is impregnated with this resin and then cured by means of energy radiation typified by UV.

The aforesaid curing method, compositions, molded articles and molding methods are effective without regard to the UV screening properties of fibers or fillers, and the length, size and shape thereof. Moreover, they can be utilized not only in the field of composite materials, but also in the fields of adhesives, sealers, varnishes, paints, coating materials, inks, toners and the like.

BACKGROUND ART

In recent years, energy radiation-curable resins typified by UV-curable resins are being used in various fields and applications. These resins are characterized in that they are cured only in regions exposed to more than a certain amount of energy radiation. On the other hand, energy radiation typified by UV radiation is characterized in that it is attenuated while it passes through a resin. As a result, it is difficult for energy radiation to reach the deep part of a resin, or energy radiation is greatly attenuated or absorbed, for example, in the presence of a substance capable of absorbing a wavelength equal to that of the energy radiation. Thus, photo-curable resins are cured only in a surface layer having a thickness of several micrometers to several millimeters through which energy radiation can pass, and the deep part thereof remain uncured. Consequently, it is difficult or impossible to apply photo-curable resins to thick-walled materials. Moreover, in the case of resins containing fillers and other substances hindering the passage of energy radiation, they tend to undergo inhibition of their cure and hence become incurable. Owing to these problems, their application has been chiefly limited to the fields of photoresists, coatings, paints, adhesives, varnishes and the like.

Typical solutions to these problems are offered by highly UV-curable resins (Mitsubishi Rayon Co., Ltd.; active energy radiation-curable compositions; Japanese Patent Provisional Publication No. 8-283388/'96) and UV- and heat-cocurable resins {Optomer KS series (Asahi Denka Kogyo K.K.); Radicure (Hitachi Chemical Co., Ltd.); UE resin (Toyobo Co., Ltd.); Japanese Patent Publication (JP-A) No. 6-38023/'86; and the like}. However, highly UV-curable resins still have the problem that they cannot be cured when energy radiation is blocked by a filler or the like. Moreover, in UV- and heat-cocurable resins which are cured by heating after exposure to UV radiation, their energy radiation curability is similar to that of conventional photo-curable resins, and the problems associated with the curing of thick-walled resins and filler-containing resins remain entirely unsolved. Thus, under the existing circumstances, these problems cannot be solved and are hence coped with by heat curing subsequent to photo-curing (of a surface layer alone).

If a technique by which the above-described thick-walled resins containing an energy radiation screening substance or highly capable of attenuating or absorbing energy radiation can be cured rapidly is established, this technique may be applied not only to conventional fields of application, but also to various other fields in which the application of energy radiation curing has been impossible owing to the problems of photo-curable resins. One example thereof is application to the matrix resins of FRPs, particularly CFRPs.

Conventionally, a variety of processing techniques and production processes are employed for FRPs, but the matrix resin consists of a thermosetting or thermoplastic resin in most cases. The problems associated with the molding of FRPs, particularly CFRPs, are that high processing costs are involved because a long curing time results from complicated temperature control, a large-sized heating oven is required for the curing of large-sized FRPs, resins capable of being cured at room temperature in a short period of time cannot be used for large-sized FRPs requiring a long curing time, the molding of FRPs is difficult because the resin-impregnated state varies according to changes in resin viscosity with temperature, and the formation of voids arises from residual solvent during the curing of the resin and causes a reduction in the quality of the molded article.

Recently, as a solution to these problems, the utilization of a photo-curable resin as the matrix resin is attracting attention. A particular and typical example of this matrix resin curing method is the filament winding molding process of Loctite Corp. which uses a combination of UV curing and heat curing (Loctite Corp.; Fiber/resin composition and its preparation method; Published Japanese Translation of PCT International Publication No. 7-507836/'95). However, in the FRP molding process using such a composition, an uncured resin-impregnated FRP is irradiated with UV radiation so as to cure its surface and so as thicken (or gelatinize) its inner part extremely and thereby enable the maintenance of its shape and resin-impregnated state to some extent, and then heated to achieve a complete cure. Accordingly, as compared with the conventional production process using a thermoplastic or thermosetting resin, the change in resin viscosity with temperature is very slight and the handling of the FRP after resin impregnation is easy, but a heat curing step is still required in order to achieve a complete cure. Thus, the problem of high processing costs arising from the fuel and light expenses and operating time required for heat curing, the problem of a long curing time, and the need for a large-sized heating oven in the molding of large-sized FRPs remain unsolved.

DISCLOSURE OF THE INVENTION

In view of the above-described disadvantages of conventional resins cured by energy radiation and the above-described disadvantages of FRPs, particularly CFRPs, the present inventors made intensive investigations on the energy radiation curing of thick-walled resins containing an energy radiation screening substance (i.e., a substance capable of screening energy radiation) and the energy radiation curing of FRPs, particularly CFRPs, and have now attained the present invention. An object of the present invention is to provide a novel resin curing method which enables the energy radiation curing of resin systems containing substances highly capable of screening energy radiation {e.g., carbon, carbon fiber (CF), metals and other inorganic fillers}, such as carbon fiber-reinforced composite materials (CFRPs) and carbon/metal/inorganic matter-containing resins, as well as compositions therefor, molded articles made therefrom, and molding methods thereof.

Another object of the present invention is to incorporate a specific photopolymerization initiator (reaction catalyst system) comprising at least two components (i.e., a system comprising two or more components) into a resin composition highly capable of screening energy radiation, such as a carbon fiber-reinforced composite material (CFRP), whereby even the shaded part or deep part of the resin composition can be completely cured solely by exposure to energy radiation such as UV or EB.

The above objects can be effectively accomplished by various inventions summarized below.

(1) A resin curing method wherein, when energy is applied to a resin composition, another kind of energy than the energy from an external energy source is autogenously generated within the resin, so that the resin composition is cured by means of the autogenously generated energy, or both the autogenously generated energy and the energy from the external energy source.

(2) A resin curing method wherein, when energy is applied to a resin composition, another kind of first energy than the energy from an external energy source is autogenously generated within the resin, and the same kind of second energy is successively generated by the autogenously generated energy, so that the resin composition is cured by means of the first and second energies, or both the first and second energies and the energy from the external energy source.

(3) A resin curing method wherein, when a resin composition is exposed to energy radiation, another kind of energy than the energy from an external energy radiation source is autogenously generated within the resin, so that the resin composition is cured by means of the autogenously generated energy, or both the autogenously generated energy and the energy from the external energy radiation source.

(4) A resin curing method wherein, when a resin composition is exposed to energy radiation, another kind of first energy than the energy from an external energy radiation source is autogenously generated within the resin, and the same kind of second energy is successively generated by the autogenously generated energy, so that the resin composition is cured by means of the first and second energies, or both the first and second energies and the energy from the external energy radiation source.

(5) A resin curing method wherein heat energy is autogenously generated within the resin as the generated energy described above in (3), so that the resin composition is cured by means of the heat energy, or both the heat energy and the energy from the external energy radiation source, whether or not the resin composition contains a substance capable of screening energy radiation (hereinafter referred to as "an energy radiation screening substance").

(6) A resin curing method wherein a first heat energy is autogenously generated within the resin as the generated energy described above in (4), and a second heat energy is successively generated by the generated first heat energy, so that the resin composition is cured by means of the first and second heat energies, or both the first and second heat energies and the energy from the external energy radiation source, whether or not the resin composition contains an energy radiation screening substance.

(7) A resin curing method wherein the heat of curing reaction evolved during the cure of the resin composition by exposure to external energy radiation is positively generated as the heat energy autogenously generated within the resin as described above in (5), so that the resin composition is cured by means of the reaction heat energy, or both the reaction heat energy and the energy from the external energy radiation source, whether or not the resin composition contains an energy radiation screening substance.

(8) A resin curing method wherein the heat of curing reaction evolved during the cure of the resin composition by exposure to energy radiation is positively generated as the first heat energy autogenously generated within the resin as described above in (6), and the curing reaction is further effected, like a chain reaction, by the action of the heat of curing reaction to generate additional heat of curing reaction as the successively generated second heat energy, so that the resin composition is cured by means of the first and second reaction heat energies, or both the first and second reaction heat energies and the energy from the energy radiation source, whether or not the resin composition contains an energy radiation screening substance.

(9) A resin curing method wherein, in the curing reaction described above in any of (1) to (8), at least one species selected from the group consisting of a cation, a radical and an anion is utilized to induce curing or facilitate the curing reaction by the action of the energy from the external energy source, the energy radiation from the energy radiation source, or the heat of reaction.

(10) A resin curing method as described above in (9) wherein, when the resin composition is exposed to energy radiation, a cation and a first heat of curing reaction evolved during the cure of the resin composition by the action of the energy radiation are positively generated within the resin, and the curing reaction is further effected, like a chain reaction, by the action of the cation and the first heat of curing reaction to successively generate an additional cation and a second heat of curing reaction, so that the resin composition is cured by means of the first and second reaction heat energies and the cation, or the combination of the first and second reaction heat energies, the cation, and the energy from the energy radiation source, whether or not the resin composition contains an energy radiation screening substance.

(11) A resin curing method as described above in any of (1) to (10) wherein the cure of the resin composition is facilitated by warming it previously in a temperature range which does not cause its cure.

(12) A resin curing method as described above in any of (1) to (11) wherein a polymerization initiator is used.

(13) A resin curing method as described above in any of (1) to (12) wherein the cure of the composition is initiated by means of heat or the composition is cured by means of heat.

(14) A photopolymerization initiator comprising at least two components including a photopolymerization initiator and a photo- and thermopolymerization initiator for initiating polymerization by means of both light and heat, and serving as the polymerization initiator making it possible to carry out a resin curing method as described above in (13).

(15) A photopolymerization initiator comprising at least two components as described above in (14) wherein a photo- and thermopolymerization initiator having a powerful polymerization-initiating effect upon exposure to heat is used as the photo- and thermopolymerization initiator.

(16) A photopolymerization initiator comprising at least two components which includes at least one photopolymerization initiator comprising at least two components as described above in (14) or (15), and a thermopolymerization initiator.

(17) A photopolymerization initiator comprising at least two components as described above in any of (14) to (16) which consists essentially or entirely of radical polymerization initiators.

(18) A photopolymerization initiator comprising at least two components as described above in any of (14) to (16) which consists essentially or entirely of anionic polymerization initiators.

(19) A photopolymerization initiator comprising at least two components as described above in any of (14) to (16) which consists essentially or entirely of cationic polymerization initiators.

(20) A photopolymerization initiator comprising at least two components as described above in (19) wherein the photopolymerization initiator comprises at least one compound selected from diazonium salt type compounds, iodonium salt type compounds, pyridinium salt type compounds, phosphonium salt type compounds, sulfonium salt type compounds, iron-arene complex type compounds, and sulfonate type compounds, and the photo- and thermopolymerization initiator comprises at least one of the sulfonium salts represented by the following general formulae (I), (II), (III), (IV), (V), (VI) and (VII).

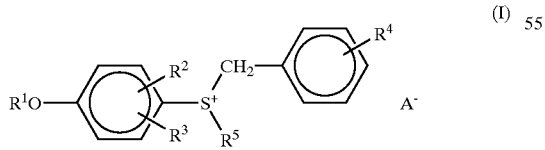
(I)

where $R^1$ represents hydrogen, methyl, acetyl or methoxycarbonyl, $R^2$ and $R^3$ each independently represents hydrogen, halogen or an alkyl group of 1 to 4 carbon atoms, $R^4$ represents hydrogen, halogen or methoxy, $R^5$ represents an alkyl group of 1 to 4 carbon atoms, and A represents $SbF_6$, $PF_6$, $AsF_6$ or $BF_4$.

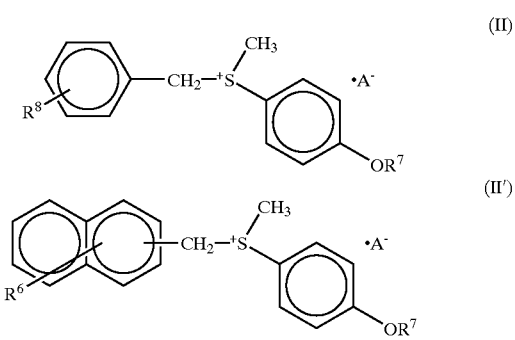
(II)
(II')

where $R^6$ represents a hydrogen atom, a halogen atom, a nitro group or a methyl group, $R^1$ represents a hydrogen atom, $CH_3CO$ or $CH_3OCO$, and A represents $SbF_6$, $PF_6$, $BF_6$ or $AsF_6$.

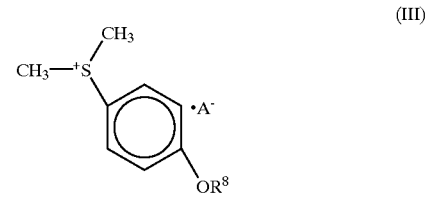
(III)

where $R^8$ represents a hydrogen atom, $CH_3CO$ or $CH_3OCO$, and A represents $SbF_6$, $PF_6$, $BF_6$, $AsF_6$ or $CH_3SO_4$.

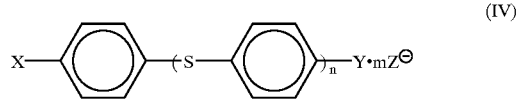
(IV)

where X represents a sulfonio group of the general formula

(a)

in which $R^9$ represents an aliphatic group of 1 to 18 carbon atoms, $R^{10}$ represents an aliphatic group of 1 to 18 carbon atoms or a substituted or unsubstituted aromatic group of 6 to 18 carbon atoms, and $R^9$ and $R^{10}$ may be joined together to form a ring; Y represents a sulfonio group of the general formula

(b)

in which $R^{11}$ represents an aliphatic group of 1 to 18 carbon atoms, $R^{12}$ represents an aliphatic group of 1 to 18 carbon atoms or a substituted or unsubstituted aromatic group of 6 to 18 carbon atoms, and $R^{11}$ and $R^{12}$ may be joined together to form a ring, or Y represents a hydrogen a hydrogen atom, a halogen atom, a nitro group, an alkoxy group, an aliphatic group of 1 to 18 carbon atoms, or a substituted or unsubstituted phenyl, phenoxy or thiophenoxy group of 6 to 18 carbon atoms; n and m are each independently 1 or 2; and Z is an anion represented by the formula $MQ_1$ or $MQ_{1-1}OH$ in which M is B, P, As or Sb, Q is a halogen atom, and 1 is 4 or 6.

(V)

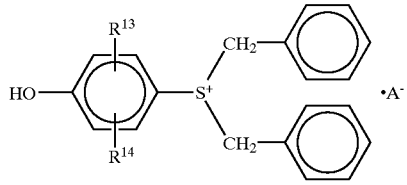

where $R^{13}$ and $R^{14}$ independently represent hydrogen or alkyl groups of 1 to 4 carbon atoms, and A represents $SbF_6$, $PF_6$ or $AsF_6$.

(VI)

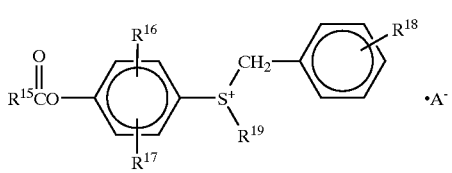

where $R^{15}$ represents ethoxy, phenyl, phenoxy, benzyloxy, chloromethyl, dichloromethyl, trichloromethyl or trifluoromethyl, $R^{16}$ and $R^{17}$ each independently represents hydrogen, halogen or an alkyl group of 1 to 4 carbon atoms, $R^{18}$ represents hydrogen, methyl, methoxy or halogen, $R^{19}$ represents hydrogen, methyl, methoxy or halogen, $R^{19}$ represents an alkyl group of 1 to 4 carbon atoms, and A represents $SbF_6$, $PF_6$, $BF_4$ or $AsF_6$.

(VII)

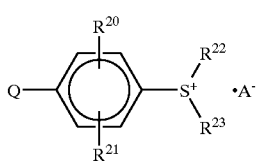

where Q represents methoxycarbonyloxy, acetoxy, benzyloxycarbonyloxy or dimethylamino, $R^{20}$ and $R^{21}$ each independently represents hydrogen or an alkyl group of 1 to 4 carbon atoms, $R^{22}$ and $R^{23}$ each independently represents an alkyl group of 1 to 4 carbon atoms, and A represents $SbF_6$, $PF_6$, $AsF_6$ or $BF_4$.

(21) A photopolymerization initiator comprising at least two components as described above in (20) wherein the photopolymerization initiator comprises an arylsulfonium salt type compound, and the photo- and thermopolymerization initiator comprises at least one sulfonium salt represented by the general formula (I), (II) or (III).

(22) A photopolymerization initiator comprising at least two components which includes at least one of the photopolymerization initiator comprising at least two components as described above in any of (19) to (21), and a thermopolymerization initiator comprising at least one of the compounds represented by the following chemical formulae (VIII) and (IX).

(VIII)

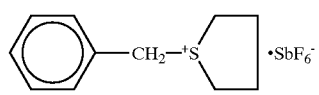

(IX)

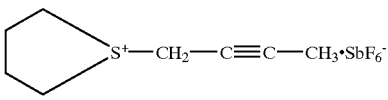

(23) A composition making it possible of carry out a curing method as described above in any of (1) to (13) wherein, when the composition is exposed to energy radiation, another kind of energy than the energy from the energy radiation source is autogenously generated within the composition, or wherein, when the composition is exposed to the energy radiation, another kind of first energy than the energy from the energy radiation source is autogenously generated within the composition, and the same kind of second energy is successively generated by the generated first energy.

(24) A composition as described above in (23) which contains a photopolymerization initiator and a photopolymerizable oligomer or photopolymerizable monomer.

(25) A composition as described above in (23) or (24) which contains, as an essential ingredient, a photopolymerization initiator comprising at least two components as described above in any of (14) to (22).

(26) A resin composition as described above in (25) which comprises, as essential ingredients, any of the photopolymerization initiators comprising at least two components as described above in any of (19) to (22), and a cationic photopolymerizable oligomer or cationic photopolymerizable monomer.

(27) A resin composition as described above in (26) wherein a photbpolymerizable epoxy oligomer or photopolymerizable epoxy monomer is used as the cationic photopolymerizable oligomer or cationic photopolymerizable monomer.

(28) A resin composition as described above in (27) wherein a photopolymerizable alicyclic epoxy oligomer or photopolymerizable alicyclic epoxy monomer is used as the photopolymerizable epoxy oligomer or photopolymerizable epoxy monomer.

(29) A resin composition as described above in (28) wherein 3,4-epoxycyclohexylmethyl 3,4-epoxycyclohexanecarboxylate is used as the photopolymerizable alicyclic epoxy monomer.

(30) A resin composition as described above in any of (25) to (29) wherein the photopolymerization initiator comprising at least two components is contained in an amount of 0.5 to 6.0 parts by weight per 100 parts by weight of the photopolymerizable resin component (photopolymerizable oligomer or monomer), and the weight ratio of the photo- and thermopolymerization initiator to the photopolymerization initiator constituting the photopolymerization initiator comprising at least two components is in the range of 1 to 4.

(31) A resin composition as described above in (30) which comprises a photopolymerization initiator comprising at least two components as described above in any of (20) to (22), and a photopolymerizable resin component as described above in any of (26) to (29).

(32) A composition as described above in any of (23) to (31) which contains at least one additive selected from energy radiation screening substances, various fillers and organic components.

(33) A composition as described above in any of (23) to (32) which additionally contains at least one additive selected from photosensitizers, reactive diluents and photosensitive compounds.

(34) A cured product obtained by a method as described above in any of (1) to (13).

(35) A molded article made from a composition containing a photopolymerization initiator comprising at least two components as described above in any of (4) to (22).

(36) A molded article made from a composition as described above in any of (23) to (33).

(37) A molding material, fiber-reinforced composite material, carbon fiber-reinforced composite material, other composite material, adhesive, sealer, varnish, paint or coating material, ink or toner which contains a composition making it possible to carry out a resin curing method as described above in any of (1) to (13).

(38) A molding material, fiber-reinforced composite material, carbon fiber-reinforced composite material, other composite material, adhesive, sealer, varnish, paint or coating material, ink or toner which contains a photopolymerization initiator comprising at least two components as described above in any of (14) to (22).

(39) A molding material, fiber-reinforced composite material, carbon fiber-reinforced composite material, other composite material, adhesive, sealer, varnish, paint or coating material, ink or toner which contains a composition as described above in any of (23) to (33).

(40) A method of making a molded article of a molding material, fiber-reinforced composite material, carbon fiber-reinforced composite material or other composite material, a cured product of an adhesive, sealer, varnish, paint or coating material, or matter printed with ink or toner, by utilizing a resin curing method as described above in any of (1) to (13).

(41) A method of making a molded article of a molding material, fiber-reinforced composite material, carbon fiber-reinforced composite material or other composite material, a cured product of an adhesive, sealer, varnish, paint or coating material, or matter printed with ink or toner, by utilizing a resin composition making it possible to carry out a curing method as described above in any of (1) to (13).

(42) A method of making a molded article of a molding material, fiber-reinforced composite material, carbon fiber-reinforced composite material or other composite material, a cured product of an adhesive, sealer, varnish, paint or coating material, or matter printed with ink or toner, by utilizing a composition containing a photopolymerization initiator comprising at least two components as described above in any of (14) to (22).

(43) A method of making a molded article of a molding material, fiber-reinforced composite material, carbon fiber-reinforced composite material or other composite material, a cured product of an adhesive, sealer, varnish, paint or coating material, or matter printed with ink or toner, by utilizing a resin composition as described above in any of (23) to (33).

(44) A method of making a fiber-reinforced composite material or carbon fiber-reinforced composite material as described above in any of (40) to (43) wherein the fiber-reinforced composite material or carbon fiber-reinforced composite material is made by utilizing at least one technique selected from hand lay-up, spray-up, filament winding, tape winding, roll winding, draw molding and continuous roll pressing.

(45) A method of making a prepreg which comprises impregnating a reinforcing fiber or a reinforcing fiber cloth material with a resin composition as described above in any of (23) to (33).

(46) A method of making a fiber-reinforced composite material which comprises stacking prepregs made by the method described above in (45), and curing them according to a curing method as described above in any of (1) to (13).

(47) A method of making a fiber-reinforced composite material which comprises impregnating a three-dimensional textile with a composition as described above in any of (23) to (33), and curing it according to a curing method as described above in any of (1) to (13).

(48) A method of repairing a fiber-reinforced composite material, building, structure or product which comprises filling a part to be repaired of a fiber-reinforced composite material, building, structure or product with a composition as described above in any of (23) to (33), or attaching a prepreg made by the method described above in (45) to a part to be repaired of a fiber-reinforced composite material, building, structure or product; and curing the composition or prepreg according to a curing method as described above in any of (1) to (13).

(49) A method of reinforcing a fiber-reinforced composite material, building, structure or product which comprises attaching a prepreg made by the method described above in (45) to a part to be reinforced of a fiber-reinforced composite material, building, structure or product, and curing the prepreg according to a curing method as described above in any of (1) to (13), or which comprises using a composition as described above in any of (23) to (33), attaching a reinforcing fiber or reinforcing fiber cloth material to a part to be reinforced of a fiber-reinforced composite material, building, structure or product by spray-up or brushing, and curing the composition according to a curing method as described above in any of (1) to (13)

(50) A method as described above in any of (40) to (49) wherein carbon fiber is used as the fibrous material.

(51) A method as described above in any of (40) to (50) wherein there is used a material in which the composition contains a photopolymerization initiator comprising at least two components as described above in any of (20) to (22).

(52) A method as described above in any of (40) to (50) wherein there is used a material comprising a composition as described above in (30).

(53) A method as described above in any of (40) to (50) wherein there is used a composition as described above in (31).

(54) A molded article made by a method as described above in any of (40) to (43).

(55) A fiber-reinforced composite material or carbon fiber-reinforced composite material as described above in any of (37) to (39).

(56) A molded article made by the method described above in (44).

(57) A prepreg made by the method described above in (45).

(58) A fiber-reinforced composite material obtained by curing a prepreg as described above in (57).

(59) A fiber-reinforced composite material obtained by impregnating a three-dimensional textile with a composition as described above in any of (23) to (33), and curing the resin composition.

(60) A repair material for filling a part to be repaired of a fiber-reinforced composite material, building, structure or product which comprises a composition as described above in any of (23) to (33).

(61) A reinforcing material for a fiber-reinforced composite material, building, structure or product which comprises a composition as described above in any of (23) to (33).

(62) A material or molded article as described above in any of (37) to (39) or any of (54) to (61) wherein carbon fiber is used as the fibrous material.

(63) A material or molded article as described above in any of (37) to (39) or any of (54) to (62) wherein the composition contains a photopolymerization initiator comprising at least two components as described above in any of (20) to (22).

(64) A material or molded article as described above in any of (37) to (39) or any of (54) to (62) which comprises a composition as described above in (30).

(65) A material or molded article as described above in any of (36) to (38) or any of (54) to (62) which comprises a composition as described above in (30).

In the above-described methods of the present invention, particularly in the methods described in (1) to (13), the resin composition can be cured by causing energy (e.g., heat energy) to be autogenously generated within the resin and, in some cases, causing energy to be successively generated by the generated energy. Specifically, the above-described methods can be carried out by using, as the polymerization reaction catalyst, a photopolymerization initiator system (reaction catalyst system) comprising at least two components including a photopolymerization initiator and a photo- and thermopolymerization initiator.

That is, to sum up more briefly, the present invention is characterized by a novel resin curing mechanism enabling the energy radiation curing of CFRPs and thick-walled resins containing an energy radiation screening substance, photopolymerization initiator systems (reaction catalyst systems) comprising at least two components and capable of inducing this curing mechanism, and compositions containing them. It is preferable to use a photopolymerization initiator system (reaction catalyst system) comprising at least two components in which the photopolymerization initiator comprises at least one compound selected from diazonium salt type compounds, iodonium salt type compounds, pyridinium salt type compounds, phosphonium salt type compounds, sulfonium salt type compounds, iron-arene complex type compounds and sulfonate type compounds, and the photo- and thermopolymerization initiator comprises at least one of the sulfonium salts represented by the general formulae (I) to (VII). It is more preferable to use a photopolymerization initiator system (reaction catalyst system) comprising at least two components in which the photopolymerization initiator comprises an arylsulfonium type compound (i.e., a triarylsulfonium type compound) and the photo- and thermopolymerization initiator comprises at least one of the sulfonium salts represented by the general formulae (I), (II) and (III).

Moreover, thermopolymerization initiators, typified by those of chemical formulae (VIII) and (IX), may be added to the aforesaid photopolymerization initiator systems comprising at least two components. Furthermore, the present invention also relates to the compositional range of specific photopolymerization initiator systems comprising at least two components; resin compositions capable of inducing the novel resin curing mechanism, the formulations thereof, and molded articles made therefrom; a method for utilizing the aforesaid curing mechanism and resin compositions; and a method of making FRPs using such a resin as the matrix resin, resin compositions therefor, and molded articles made therefrom.

BEST MODE FOR CARRYING OUT THE INVENTION

Figure 2:
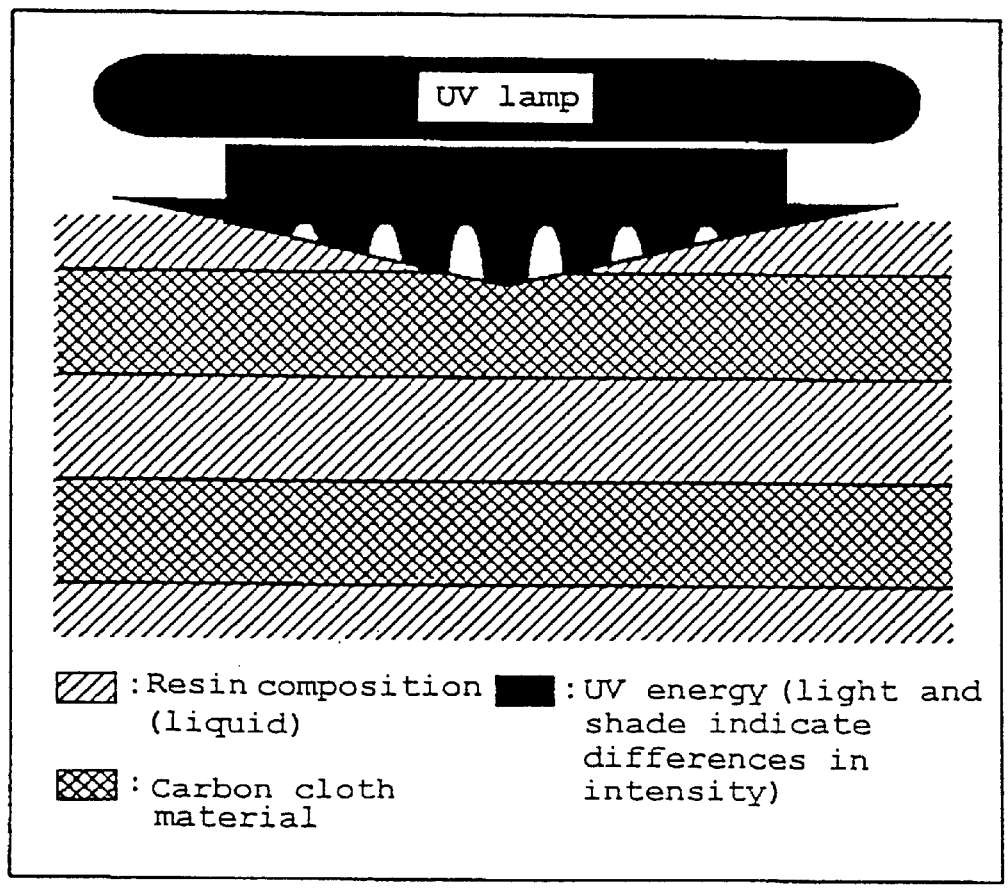
FIG. 2 is a schematic view illustrating the manner in which UV energy is attenuated while it passes through a resin composition containing a carbon cloth material.
Figure 3:
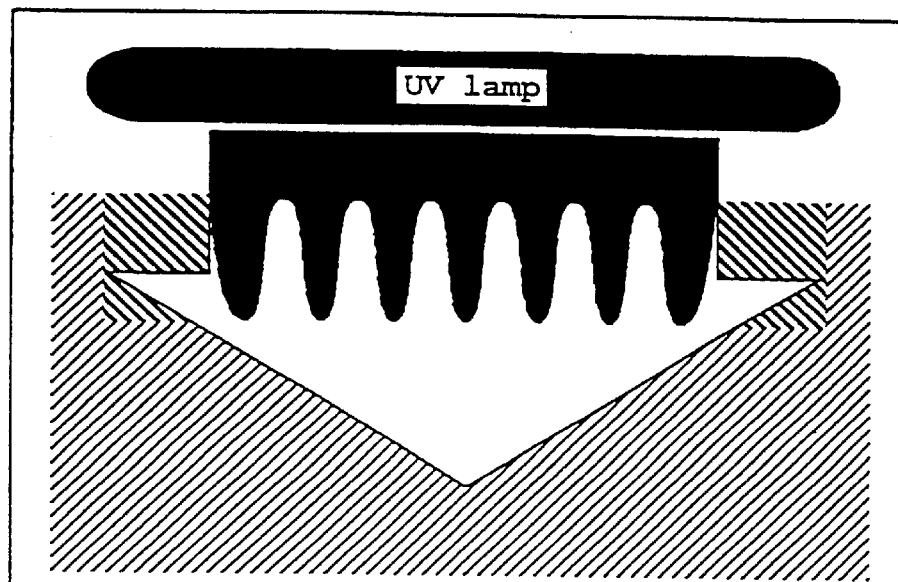
FIG. 3 includes schematic views illustrating the UV-cured state of the respective resin compositions shown in FIGS. 1 and 2.
Figure 3:
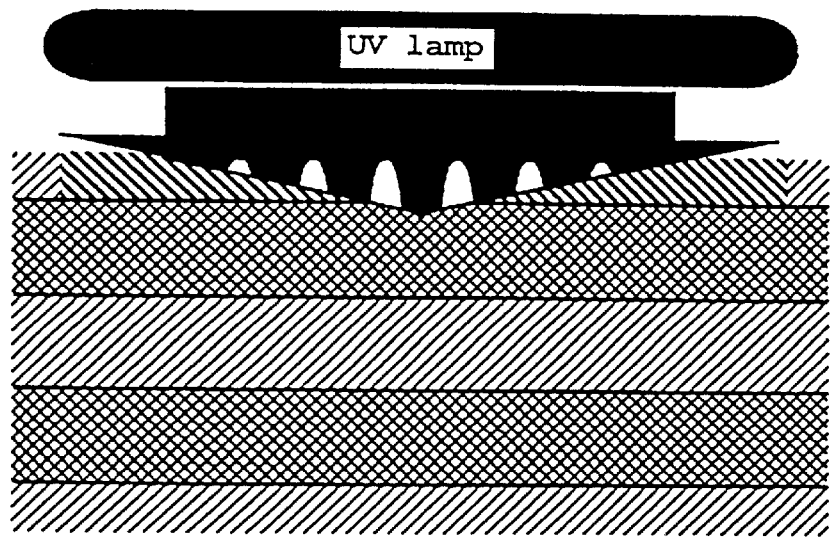

First of all, the present inventors have paid attention to the fact that resins containing an energy radiation screening substance and thick-walled resins, and their applications such as FRPs and CFRPs, cannot be cured with energy radiation because ① energy typified by UV energy is attenuated while it passes through a substance (resin) (FIG. 1), ② it is easily blocked by a substance capable of absorbing the same wavelength (FIG. 2), and ③ energy radiation-curable resins typified by UV-curable resins are cured only in regions through which more than a certain amount of energy radiation has passed (FIG. 3). With consideration for the fact that the features ① and ② are based on fundamental principles and hence hard to modify, the present inventors made intensive investigations on the securement of energy required for curing purposes, the prevention of energy required for curing purposes from being blocked, and a novel resin curing mechanism enabling the cure of regions not exposed to energy radiation. As a result, the present inventors have revealed a novel resin curing mechanism in which, when a resin composition is exposed to energy radiation or energy is applied to a resin composition, another kind of energy is autogenously generated within the resin, so that the resin composition is cured by means of this energy, or both this energy and the energy from the energy radiation source or energy source, and have developed a resin curing method based on this mechanism.

Figure 1:
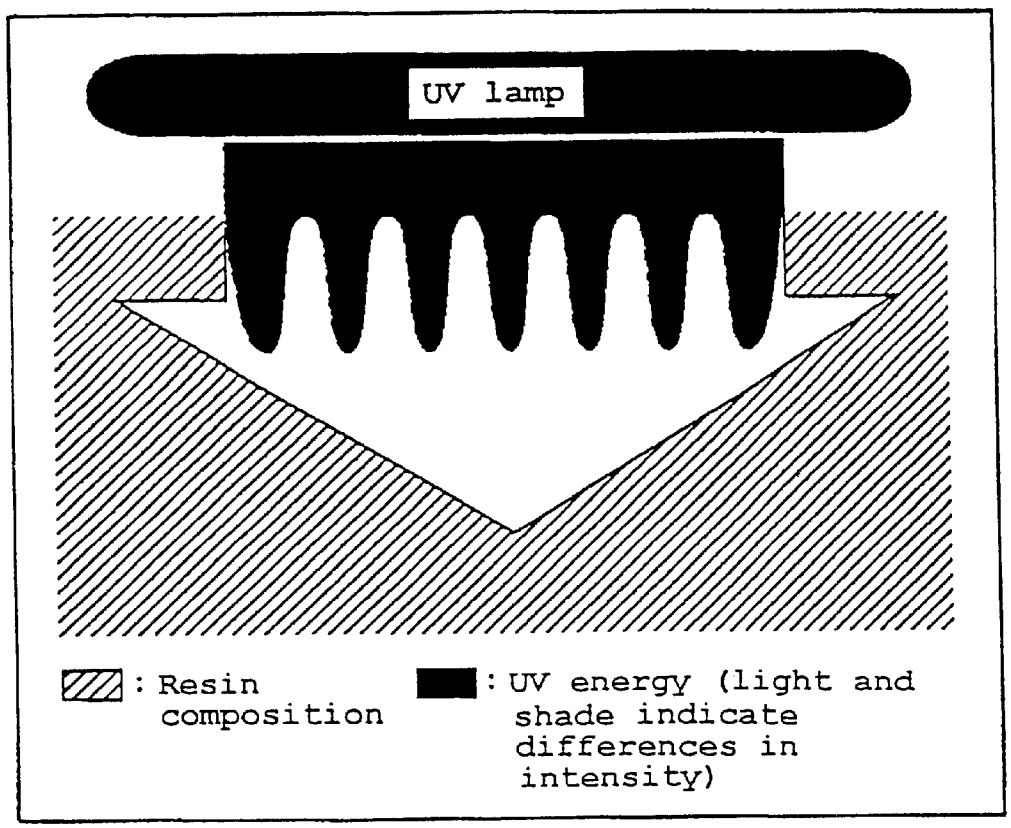
FIG. 1 is a schematic view illustrating the manner in which UV energy is attenuated while it passes through a resin composition.

In FIG. 1, the manner in which the intensity of UV energy is gradually attenuated while energy radiation from a UV lamp passes through a resin composition is indicated by light and shade in an arrow (i.e., a wavy pattern in this figure). In FIG. 2, UV energy is easily blocked owing to the presence of an energy radiation screening substance such as a carbon cloth material. FIGS. 3(a) and 3(b) each illustrate the manner in which, when a liquid resin is exposed to UV energy, the resin is cured only in regions through which more than a certain amount of energy radiation has passed (as indicated by rightward inclined parallel lines in this figure). (b) indicates the case in which an energy radiation screening substance such as a carbon cloth material is present, so that the cure of the resin is interrupted by the screening substance.

Besides ultraviolet radiation, useful types of energy radiation include electron rays, X-rays, infrared radiation, sunlight, visible light, laser light (from excimer, $O_2$ and other lasers), radiated heat rays and other energy. Moreover, the applied energy may comprise not only light or electromagnetic radiation, but also heat or the like.

Figure 4:
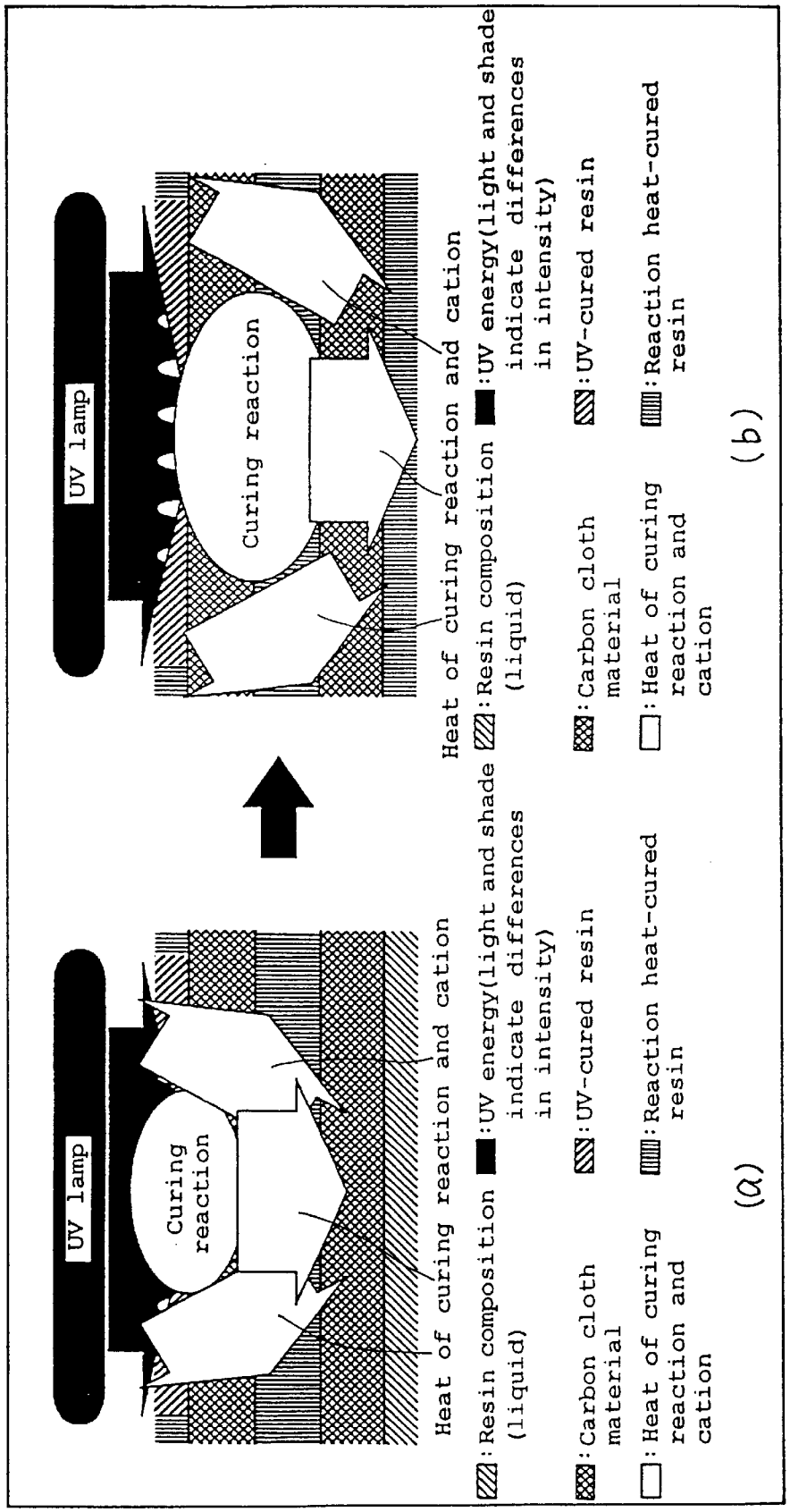
FIG. 4 includes schematic views for explaining the resin curing mechanism of the present invention (i.e., a curing system utilizing light plus heat of curing reaction and cation)

As a result of further intensive investigations based on this concept, the present inventors have discovered the successive production of autogenously generated energy, the use of heat energy as the autogenously generated energy, the successive production of heat energy, the use of heat of curing reaction (curing exotherm) as the heat energy, the utilization of a cation, radical or anion, the enhancement of curability by preheating, the utilization of a polymerization initiator, and the like, and have developed a novel resin curing mechanism in which, when a resin composition is exposed to energy radiation, a cation and heat of curing reaction (curing exotherm) are positively generated within the resin, and the resin is further cured, like a chain reaction, by the action of the cation and the heat of curing reaction to successively generate additional cation and heat of curing reaction (curing exotherm), so that the resin composition is cured by means of the reaction heat energy, or both reaction heat energy and the energy from the energy radiation source, whether or not the resin composition contains an energy radiation screening substance (FIG. 4), as well as a resin curing method based on it.

FIGS. 4(a) and 4(b) are schematic views for explaining the resin curing mechanism of the present invention (i.e., a curing system utilizing light plus heat of curing reaction and cation), and illustrate the manner in which, when a resin composition is exposed to energy radiation, a cation and heat of curing reaction are positively generated within the resin, and the resin is further cured, like a chain reaction, by the action of the cation and the heat of curing reaction. (a) indicates an initial stage and (b) indicates a stage in which the reaction heat cure of the resin composition has progressed to the lowermost layer thereof. In either case, the curing reaction proceeds whether or not the resin composition contains a carbon cloth material. Although a combination of a cation and heat of curing reaction is utilized for purposes of polymerization in this embodiment, it is a matter of common knowledge that a radical or an anion may also be utilized in the present invention as a species participating in the polymerization of the resin. Furthermore, the curing mechanism of the present invention enables resins to be cured by means of not only light or electromagnetic radiation, but also heat or other energy.

Figure 5:
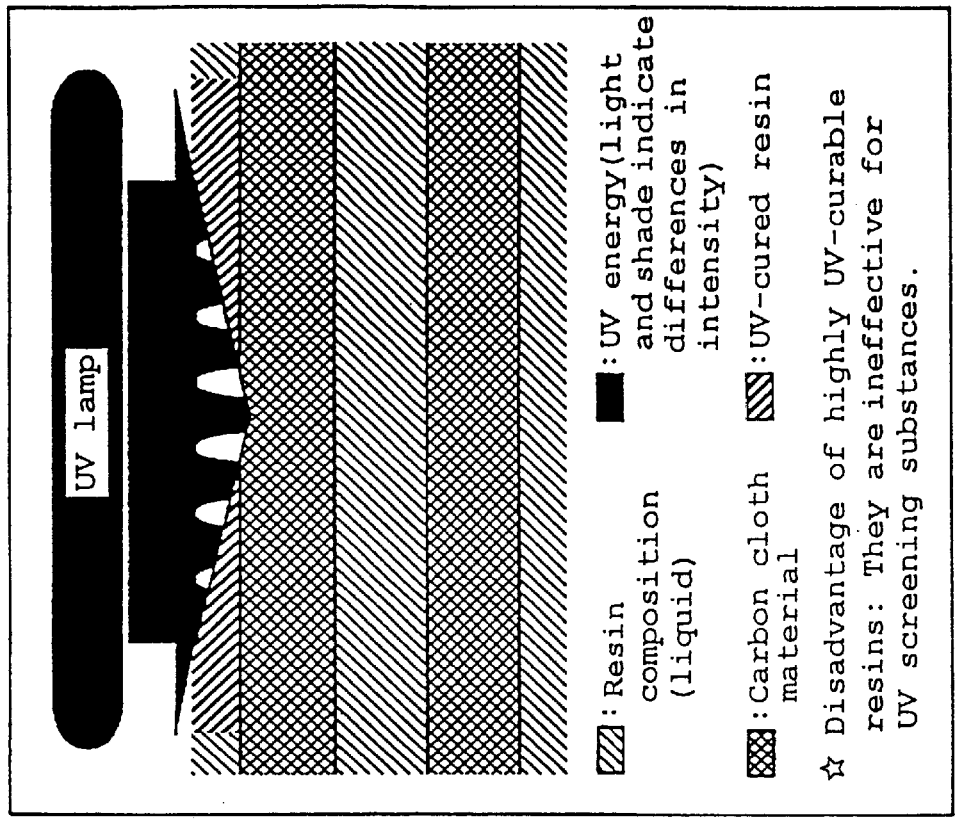
FIG. 5 is an explanatory view of a curing model for highly UV-curable resins.
Figure 5:
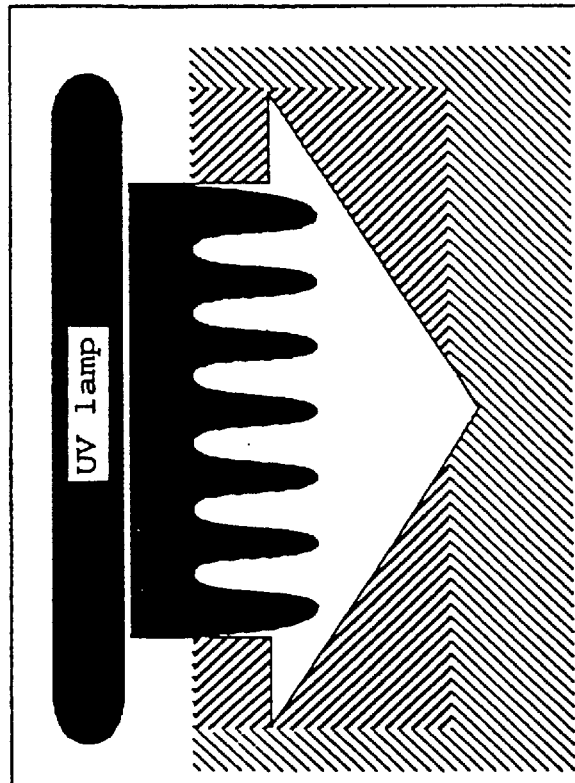
Figure 6:
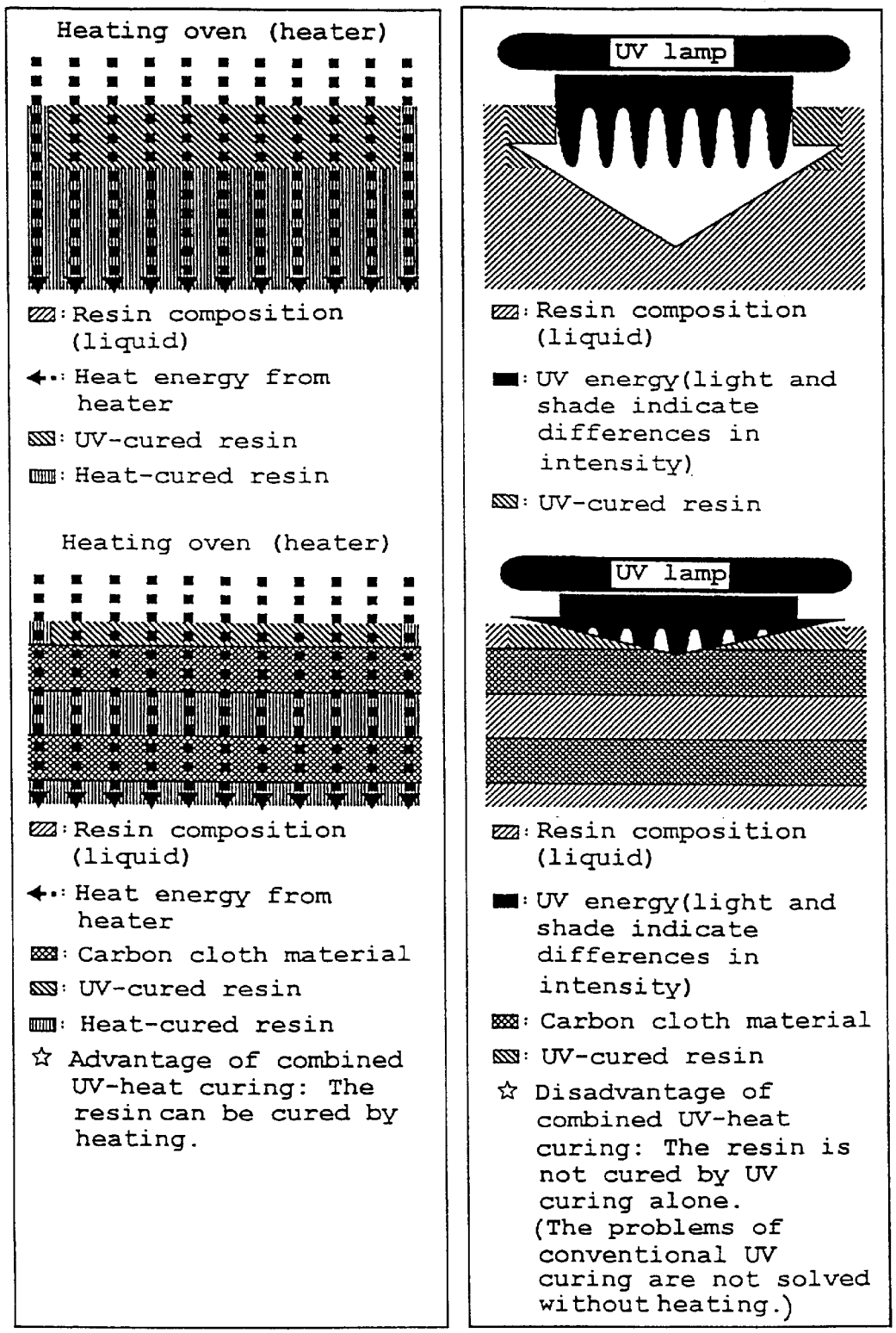
FIG. 6 is an explanatory view of a curing model for UV- and heat-curable resins known in the prior art.

This novel resin curing mechanism, which has now been developed, is quite different from the resin curing mechanisms of highly UV-curable resins and combined UV- and heat-curable resins that are typical of the prior art (FIGS. 5 and 6). Owing to this difference, the novel resin curing mechanism of the present invention does not suffer from the disadvantages of the prior art, such as the poor curability of filler-containing resins and the need for heating after exposure to energy radiation. FIGS. 5(a) and 5(b) each illustrate the resin curing mechanism of a conventional highly UV-curable resin. As shown in (a), this is advantageous in that a thick cured film can be obtained when no energy radiation screening substance is present. However, when such a screening substance is present, the curing reaction does not proceed as shown in (b).

FIG. 6(a) illustrates the resin curing mechanism of a conventional combined UV- and heat-curable resin. When this resin is exposed to UV energy as shown in (b), its cure does not proceed owing to the presence of an energy radiation screening substance (see the lower picture). Accordingly, in order to cause its cure to proceed, the resin must be heated after exposure to energy radiation as shown in (a). Where an energy radiation screening substance such as a carbon cloth material is present, the problems of conventional UV curing cannot be solved without heating. In both (a) and (b), the upper picture indicates the case in which such a screening substance is not present, and the lower picture indicates the case in which such a screening substance is present.

Next, as a result of intensive investigations on polymerization initiators capable of inducing the above-described novel resin curing mechanism and making it possible to carry out the above-described resin curing method, the present inventors have found that a photopolymerization initiator system (reaction catalyst system) comprising at least two components including a photopolymerization initiator and a photo- and thermopolymerization initiator which initiates polymerization upon exposure to both light and heat is useful in accomplishing the objects of the present invention.

In the present invention, it is preferable to use a photopolymerization initiator comprising at least one compound selected, for example, from diazonium salt type compounds shown in Table A below, iodonium salt type compounds shown in Table B, pyridinium salt type compounds represented by the following general formula

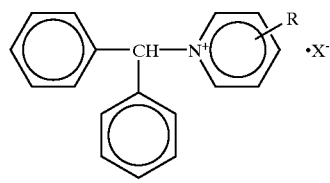

, phosphonium salt type compounds described in Japanese Patent Provisional Publication Nos. 6-157624/'94 and 7-82283/'95, sulfonium salt type compounds shown in Table C below (see Table 1 which will be given later in Example 1), iron-arene complex type compounds such as initiator ⑨ shown in Table 1, and sulfonate type compounds, in combination with a photo- and thermopolymerization initiator comprising at least one of the compounds represented by the general formulae (I) to (VII).

TABLE A

Aryldiazonium salt photo-initiators

| Cationic moiety (diazonium) | Anionic moiety | Maximum absorption wavelength (nm) |
|---|---|---|
| 2,5-Diethoxy-4-(p-toluylmercapto)benzene | $BF_4^-$ | 355, 391 |
| 2,4-Dichlorobenzene | $SnCl_6^-$ | 285 |

TABLE A-continued

Aryldiazonium salt photo-initiators

| Cationic moiety (diazonium) | Anionic moiety | Maximum absorption wavelength (nm) |
|---|---|---|
| p-Nitrobenzene | $FeCl_4^-$ | 243, 257, 310, 360 |
| p-Chlorobenzene | $PF_6^-$ | 273 |
| p-(N-morpholino)benzene | $AsF_6^-$ | 257, 378 |
| 2,5-Dichlorobenzene | $SbF_6^-$ | 238, 358 |
| o-Nitrobenzene | $BCl_6^-$ | 285, 313 |

TABLE B

Aromatic iodonium salt photo-initiators

| | Cationic moiety | Anionic moiety | λ max (nm) | ε max |
|---|---|---|---|---|
| 1. | C₆H₅—I⁺—C₆H₅ | $BF_4^-$ | 227 | 17,800 |
| 2. | CH₃—C₆H₄—I⁺—C₆H₄—CH₃ | $BF_4^-$ | 236 | 18,000 |
| 3. | CH₃—C₆H₄—I⁺—C₆H₄—CH₃ | $BF_4^-$ | 237 | 18,200 |
| 4. | CH₃—C₆H₄—I⁺—C₆H₄—CH₃ | $AsF_4^-$ | 237 | 17,500 |
| 5. | CH₃—C₆H₄—I⁺—C₆H₄—CH₃ | $BF_4^-$ | 238 | 20,800 |
| 6. | CH₃—C₆H₄—I⁺—C₆H₄—CH₃ | $PF_6^-$ | 238 | 20,000 |
| 7. | CH₃—C₆H₄—I⁺—C₆H₄—CH₃ | $AsF_6^-$ | 238 | 20,700 |
| 8. | CH₃—C₆H₄—I⁺—C₆H₄—CH₃ | $SbF_6^-$ | 238 | 21,200 |

TABLE C

Triarylsulfonium salt photo-initiators

| | Cationic moiety | Anionic moiety | λ max (nm) | ε max |
|---|---|---|---|---|
| 1. |  | $BF_2^-$ | 230 | 17,500 |
| 2. |  | $AsF_6^-$ | 230 | 17,500 |
| 3. | 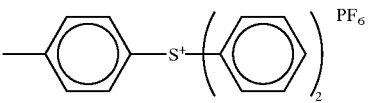 | $PF_6$ | 237, 240 | 20,400, 19,700 |
| 4. | 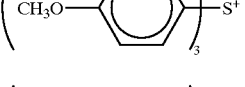 | $AsF_6^-$ | 225, 280 | 21,740, 10,100 |
| 5. | 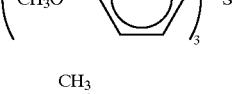 | $BF_2^-$ | 243, 278 | 24,700, 4,900 |
| 6. | 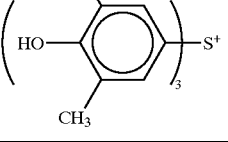 | $AsF_6^-$ | 263 280 316 | 25,200 22,400 7,700 |

Moreover, there may also be used radical photopolymerization initiators shown in the following Tables D and E.

TABLE D

P1 type photo-initiators

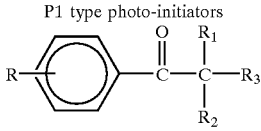

(Acetophenone structure)

| Designation | R | $R_1$ | $R_2$ | $R_3$ |
|---|---|---|---|---|
| Benzoin butyl ether | H | $OC_4H_9$ | H | $C_6H_5$ |
| Benzyl dimethyl ketal | H | $OCH_3$ | $OCH_3$ | $C_6H_5$ |
| Ethoxyacetophenone | H | $OC_2H_5$ | $OC_2H_5$ | H |
| Acyloxime ester | H | NOCO | $CH_3$ | $C_6H_5$ |
| | H | NOCO | $OC_2H_5$ | $CH_3$ |
| Chlorinated acetophenone | $C_4H_9$ | Cl | Cl | Cl |
| Hydroxyacetophenone | H | OH | $CH_3$ | $CH_3$ |

TABLE D-continued

P1 type photo-initiators

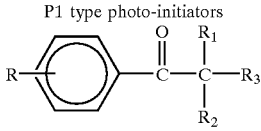

(Acetophenone structure)

| Designation | R | $R_1$ | $R_2$ | $R_3$ |
|---|---|---|---|---|

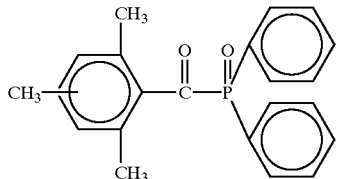

Acylphosphine oxide

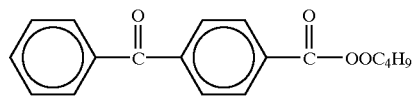

TABLE E

P2 type photo-initiators

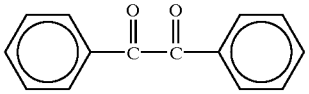

(Thioxanthone structure)

| Designation | X | R | $R_1$ |
|---|---|---|---|
| Benzophenone | — | R | H |
| Michler's ketone | — | $(CH_3)_2N$ | $(CH_3)_2N$ |
| Dibenzosuberone | $CH_2$—$CH_2$ | H | H |
| 2-Ethylanthraquinone | C=O | H | 2-$C_2H_5$ |
| Isobutylthioxanthone | S | H | 2-i-$C_3H_7$ |

Benzil

Specific examples of the compounds represented by the general formulae (I) to (III) include photopolymerization initiators ① to ③ used in the Examples which will be given later {"Journal of Polymer Science", Part A: "Polymer Chemistry", Vol. 29, 1675–1680 (1991); "Kobunshi", Vol. 40, December 1991, 794–797}.

Specific examples of the compounds represented by the general formulae (IV) include bis{4-(dimethylsulfonio) phenyl} sulfide bis-hexafluorophosphate and dimethyl-4-thiophenoxyphenylsulfonium hexafluoroantimonate.

A specific example of the compounds represented by the general formulae (V) is dibenzyl-4-hydroxyphenylsulfonium hexafluoroantimonate, a specific example of the compounds represented by the general formulae (VI) is benzyl-4-(ethoxycarbonyloxy) phenylmethylsulfonium hexafluoroantimonate, and a specific example of the compounds represented by the general formulae (VII) is 4-acetoxyphenyldimethylsulfonium hexafluoroantimonate.

Preferred examples of other combinations include photopolymerization initiator systems (reaction catalyst systems) comprising at least two components in which the photopolymerization initiator comprises at least one arylsulfonium salt type compound as shown in Table C (i.e., a triarylsulfonium salt such as photo-initiator ⑥ shown in Table 1) and the photo- and thermopolymerization initiator comprises at least one of the sulfonium salts represented by the above general formulae (I) to (III).

The present inventors carried the aforesaid investigations further and, as a result, have found that it is preferable to use, as the photo- and thermopolymerization initiator, a photo- and thermopolymerization initiator having a powerful catalytic effect upon exposure to heat, such as the compounds represented by the above general formulae (I) to (III) (i.e., photo-initiators ① to ③ shown in Table 1), and it is preferable to use, as the thermopolymerization initiator, prenyltetramethylenesulfonium hexafluoroantimonate represented by chemical formula (VIII) or 2-butynyltetramethylenesulfonium hexafluoroantimonate represented by chemical formula (IX).

Finally, as a result of similar intensive investigations on resin compositions which can induce the aforesaid novel resin curing mechanism and make it possible to carry out the aforesaid resin curing method, the present inventors have obtained the following findings. Specifically, it has been found that resin compositions comprising a photopolymerization initiator comprising at least two components and a photopolymerizable oligomer or photopolymerizable monomer, and molded articles made therefrom are useful. Among others, it is preferable to use a cationic photopolymerizable oligomer or cationic photopolymerizable monomer and, in particular, a photopolymerizable epoxy oligomer or photopolymerizable epoxy monomer. Examples of such photopolymerizable oligomers include alicyclic epoxies, glycidyl ether type epoxies, epoxidized polyolefins, epoxy (meth)acrylates, polyester acrylates and vinyl ether compounds. Examples of such photopolymerizable monomers include epoxy monomers, acrylic monomers, vinyl ether and cyclic ethers. Among others, photopolymerizable alicyclic epoxy oligomers and photopolymerizable alicyclic epoxy monomers are preferred. A particularly preferred example of such photopolymerizable alicyclic epoxy oligomers is 3,4-epoxycyclohexylmethyl 3,4-epoxycyclohexanecarboxylate.

Among others, resin compositions comprising a photopolymerization initiator system comprising at least two components in which the photopolymerization initiator comprises at least one arylsulfonium salt type compound as shown in Table C (i.e., a triarylsulfonium salt such as photo-initiator ⑥ shown in Table 1) and the photo- and thermopolymerization initiator comprises at least one of the sulfonium salts represented by the above general formulae (I) to (III), and at least one photopolymerizable epoxy monomer or oligomer such as 3,4-epoxycyclohexylmethyl 3,4-epoxycyclohexanecarboxylate, and molded articles made therefrom, are preferred.

In the present invention, the preferred formulation of the aforesaid resin compositions is such that the photopolymerization initiator system (reaction catalyst system) comprising at least two components is contained in an amount of 0.5 to 6.0 parts by weight, more preferably 1.5 to 3.5 parts by weight, per 100 parts by weight of the photopolymerizable resin component (photopolymerizable oligomer or monomer), and the weight ratio of the photo- and thermopolymerization initiator to the photopolymerization initiator constituting the photopolymerization initiator system is in the range of 1 to 4, more preferably 1.3 to 2.8. If the amount of the photopolymerization initiator system comprising at least two components is less than 0.5 part by weight, little effect will be produced. Since its amount is too small for the whole resin composition, it will not function properly. Even if its amount is greater than 6.0 parts by weight, its photocuring function will remain unchanged. If the weight ratio of the photo- and thermopolymerization initiator to the photopolymerization initiator is less than 1, a sufficient amount of heat will not be generated at the initial stage of cure. This will cause the resin to be cured only in the surface thereof, because the curing function constituting a feature of the present invention is not performed properly. If the weight ratio is greater than 4, the resin will show an undue enhancement in curing properties and, in particular, heat generation properties, resulting in foaming of the resin due to its rapid exothermic cure (the related data are shown in Tables 3 and 4 and FIGS. 9 and 10).

Furthermore, one or more of various commonly used additives, such as energy radiation screening substances {e.g., carbon, carbon fibers (short fiber, long fiber, continuous filament, carbon cloth, etc.), inorganic fillers and metal powders}, various fillers, organic components, photosensitizers, reactive diluents and photosensitive compounds, may be added to the aforesaid resin compositions in such proportions as permit the resin compositions to be cured.

In addition, the present inventors paid attention to the fact that, in the production of FRPs, particularly CFRPs, a (long-time) heat curing step is considered to be responsible for high processing costs, the size of the apparatus or equipment cannot be reduced because a large-sized heating oven is required for the curing of large-sized FRPs, a short-time curable resin cannot be used for large-sized FRPs because the starting time of cure cannot be controlled at will, it is difficult to maintain the resin-impregnated state and mold the FRP because heating in the production process causes changes in resin viscosity, and the formation of voids causing a reduction in quality arises from residual solvent, and made intensive investigations on the development of a method of making FRPS, particularly CFRPs, in which a heating step is not required, the resin is cured in a short period of time, the starting time of resin cure can be controlled at will, and no solvent is needed. As a result, the present inventors have developed a method of making FRPs and CFRPs which comprises using a resin composition of the present invention as the matrix resin, impregnating a fiber with this matrix resin, and curing the FRP or CFRP by exposure to energy radiation typified by UV radiation while utilizing the novel resin curing mechanism and resin curing method of the present invention, and products so made. The term "product" as used herein means articles, other than buildings and structures, which can be artificially made and fall within the scope of the present invention.

In a filament winding process using a combination of UV curing and heat curing, which is a typical example of conventional molding techniques, UV curing participates only in the cure of the surface of the resin and the thickening of its inner part. After all, the whole resin is cured by the application of heat as usual. In this conventional technique, therefore, various problems associated with the heat curing step (e.g., those with processing costs and operating time) and other problems such as the need for a large-sized heating oven in the molding of large-sized FRPs remain unsolved. In contrast, the method of making FRPs and CFRPs in accordance with the present invention does not involve such problems.

Figure 7:
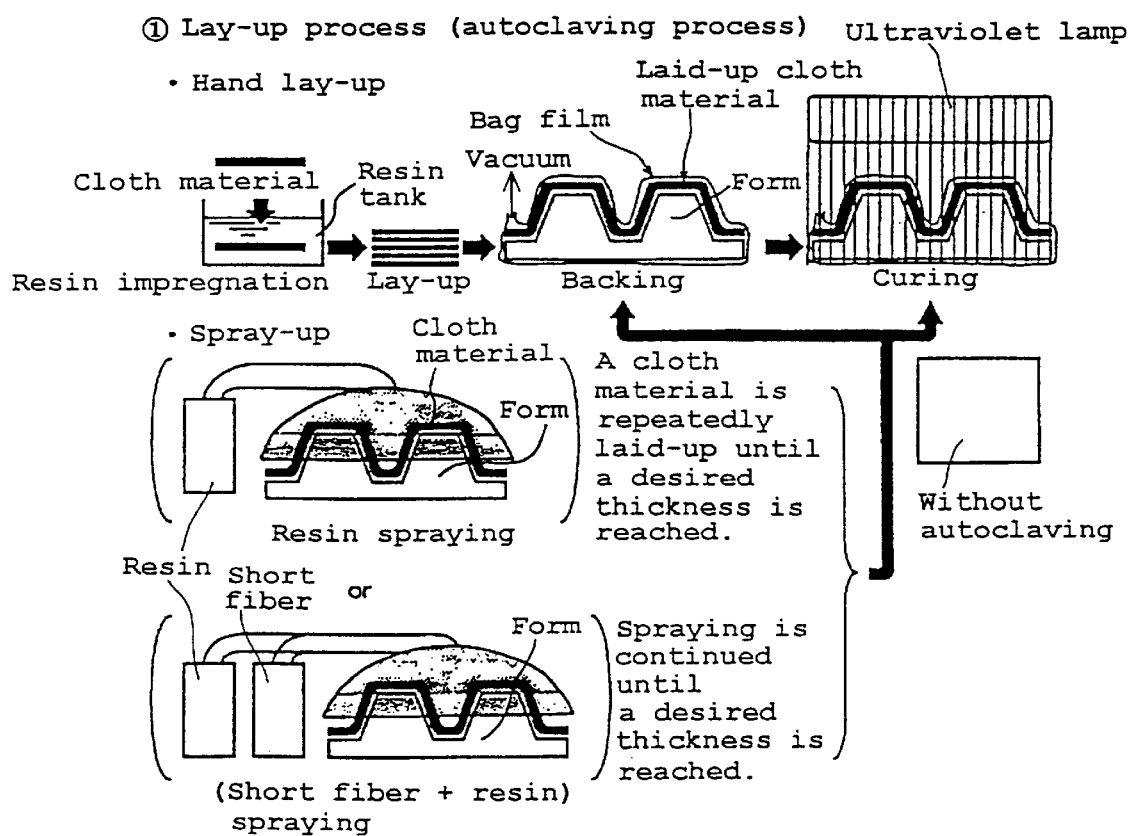
FIG. 7 is a flow diagram of an exemplary FRP molding process, illustrating ① a lay-up process.
Figure 8:
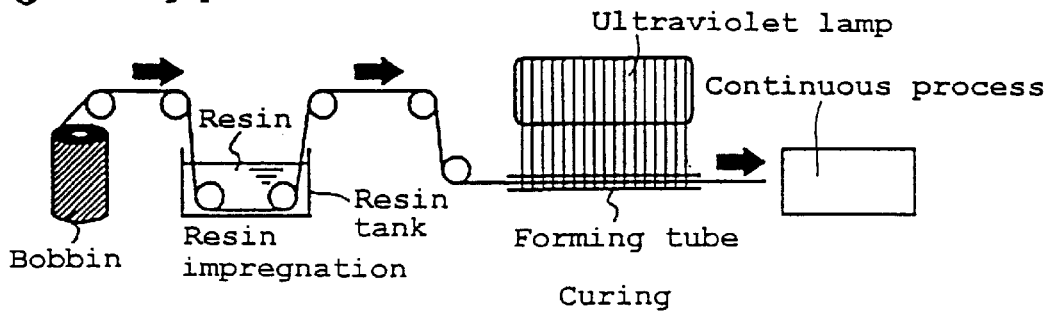
FIG. 8 is a flow diagram of exemplary FRP molding processes, illustrating ② a drawing process, ③ a filament/tape/roll winding process, and (④ a continuous roll pressing process.
Figure 8:
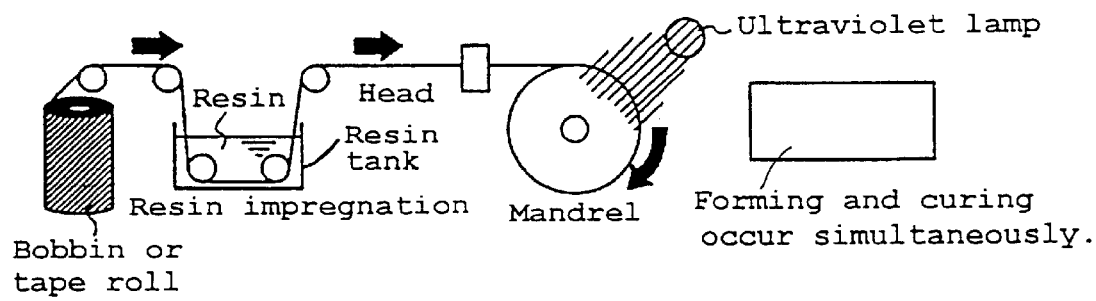
Figure 8:
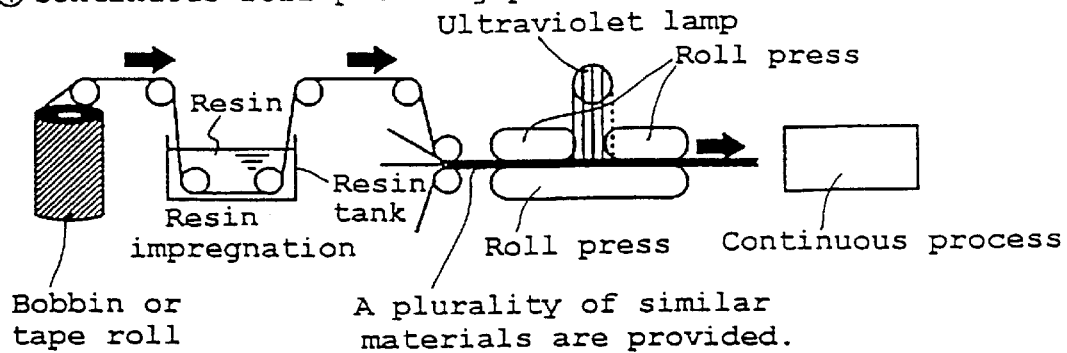

In the FRPs made according to the present invention, there may be used any of various fibers commonly used as reinforcing fibers for FRPs, such as carbon fiber, glass fiber and organic fibers. Moreover, these fibers may have any desired form such as a unidirectionally aligned material, a woven fabric or a knit fabric. Furthermore, no particular limitation is placed on the combined use of fibers, and there may be used a combination of carbon fiber and glass fiber or of carbon fiber and a hybrid therebetween. Furthermore, in order to mold FRPS, there may employed any of various common FRP-molding techniques including hand lay-up, spray-up, filament winding, tape winding, roll winding, draw molding and continuous roll pressing (FIGS. 7 and 8).

EXAMPLES

The present invention is further illustrated by the following examples. However, these examples are not to be construed to limit the scope of the invention.

Example 1

(A) 100 parts by weight of ERL-4221 (an alicyclic epoxy resin manufactured by Union Carbide Japan K.K.; 3,4-cyclohexylmethyl 3,4-epoxycyclohexanecarboxylate) was mixed with 1.75 parts by weight of San Aid SI-80L {a cationic photo- and thermopolymerization initiator manufactured by Sanshin Chemical Co., Ltd.; general formula (II)}, and 0.75 part by weight of DAICAT 11 (a cationic photopolymerization initiator manufactured by Daicel Chemical Industries Ltd.; an arylsulfonium salt).

(B) Then, a glass vessel {40 mm (diameter)×80 mm (height)} covered with black paper except its upper part was filled with the above resin to the top of the glass vessel.

(C) This resin was irradiated with UV radiation for 60 seconds. The UV irradiation was carried out under the following conditions.

Ultraviolet irradiator: UVL-1500 M2 (manufactured by Ushio Inc.)
Type of lamp: Metal halide lamp.
Intensity of lamp: 120 W/cm.
Length of lamp: 125 mm.
Atmosphere, temperature and pressure: Air, room temperature and atmospheric pressure.
Irradiation distance: 19 cm.

After UV irradiation, the resin within the glass vessel was completely cured in several minutes. The wall thickness of the resin was 80 mm (the greatest measurable value) which was the limit defined by the glass vessel.

Examples 2 to 245 and Comparative Examples 1 to 187

Tests were carried out under the same conditions as described in Example 1, except that the resin compositions shown in Table 1 were used and tested according to the formulations shown in Tables 2 and 3. The test results thus obtained are shown in Tables 2, 3 and 4 and FIG. 9. The data obtained by measuring the resin temperature due to curing exotherm are shown in FIG. 10.

TABLE 1

List of resin compositions

| Type | Composition No. | Product name or code | Remarks | Manufacturer |
|---|---|---|---|---|
| Photopolymerizable resin component (photopolymerizable oligomer or photopolymerizable monomer) | Oligomer ① | Celoxide 2021P | 3,4-Epoxycyclohexylmethyl-3,4-epoxycylcohexanecarboxylate | Daicel Chemical Industries Ltd. |
| | Oligomer ② | Celoxide 2081 | Flexible alicyclic epoxy | |
| | Oligomer ③ | Celoxide 3000 | Alicyclic epoxydiluent | |
| | Oligomer ④ | Celoxide 2000 | Alicyclic monoepoxy having a vinyl group | |
| | Oligomer ⑤ | Epolead GT301 | Polyfunctional alicyclic epoxy (trifunctional) | |
| | Oligomer ⑥ | Epolead GT401 | Polyfunctional alicyclic epoxy (tetrafunctional) | |
| | Oligomer ⑦ | EHPE3150 | Alicyclic solid epoxy | |

TABLE 1-continued

List of resin compositions

| Type | Composition No. | Product name or code | Remarks | Manufacturer |
|---|---|---|---|---|
| | Oligomer ⑧ | PB3600 | Containing epoxy/vinyl groups | |
| | Oligomer ⑨ | ERL-4221 | 3,4-Epoxycyclohexylmethyl-3,4-epoxycyclohexanecarboxylate | Union Carbide Japan K.K. |
| | Oligomer ⑩ | ERL-4299 | Flexible alicyclic epoxy | |
| | Oligomer ⑪ | ERL-4206 | Alicyclic epoxydiluent | |
| | Oligomer ⑫ | VCMX | Alicyclic monoepoxy having a vinyl group | |
| | Oligomer ⑬ | Epicoat 828 | Bisphenol A type epoxy | Yuka-Shell |
| | Oligomer ⑭ | Epicoat 806 | Bisphenol F type epoxy | Epoxy Co., Ltd. |
| | Oligomer ⑮ | Epicoat 815 | Bisphenol A type epoxy/BGE | |
| | Oligomer ⑯ | Epicoat 834 | Bisphenol A type epoxy (semisolid) | |
| | Oligomer ⑰ | Epicoat 1004 | Bisphenol A type epoxy (solid) | |
| | Oligomer ⑱ | Epicoat 1001B80 | Bisphenol A type epoxy (solution) | |
| | Oligomer ⑲ | Epicoat 5046B80 | Flame-retardant epoxy (solution) | |
| | Oligomer ⑳ | Epicoat 152 | Polyfunctional epoxy | |
| | Oligomer (1) | Epicoat 154 | Polyfunctional epoxy | |
| | Oligomer (2) | Epicoat YX310 | Tough epoxy | |
| | Oligomer (3) | 850 | Bisphenol A type epoxy | Dainippon Ink & |
| | Oligomer (4) | 830 | Bisphenol F type epoxy | Chemicals, Inc. |
| | Oligomer (5) | N-665 | Cresol novolak type epoxy | |
| | Oligomer (6) | N740 | Phenol novolak type epoxy | |
| | Oligomer (7) | ECON-102S | Cresol novolak type epoxy | Nippon Kayaku |
| | Oligomer (8) | ECON-1020 | Cresol novolak type epoxy | Co., Ltd. |
| | Oligomer (9) | EPPN-201 | Phenol novolak type epoxy | |
| | Oligomer (10) | CY177 | Alicyclic epoxy | Ciba-Geigy |
| | Oligomer (11) | CY179 | Alicyclic epoxy | (Japan) Ltd. |
| | Oligomer (12) | Rapicure CHVE | Vinyl ether | |
| Photo- and thermo-polymerization initiator | Photo-initiator ① Photo-initiator ② Photo-initiator ③ | San Aid SI-60L San Aid SI-80L San Aid SI-100L | General formula (I), (II) or (III) | Sanshin Chemical Co., Ltd. |
| | Photo-initiator ④ | — | Bis(4-(dimethylsulfonio)phenyl) sulfide bis-hexafluorophosphate (general formula (IV)) | — |
| | Photo-initiator ⑤ | — | Dimethyl-4-thiophenoxyphenylsulfonium hexaflouoroantimonate (general formula (IV)) | — |
| | Photo-initiator ⑩ | — | Dibenzyl-4-hydroxyphenylsulfonium hexafluoroantimonate (general formula (IV)) | — |
| | Photo-initiator ⑪ | — | Benzyl-4-(ethoxycarbonyloxy) phenylmethylsulfonium hexafluoroantimonate (general formula (VI)) | — |
| | Photo-initiator ⑫ | — | 4-Acetoxyphenyldimethylsulfonium hexafluoroantimonate (general formula (VII)) | — |
| Photo-polymerization initiator | Photo-initiator ⑥ | DAICAT 11 | Arylsulfonium salt (hazardous material 3-III, water-insoluble) | Daicel Chemical Industries Ltd. |
| | Photo-initiator ⑦ | CI-2734 | Sulfonium salt type (containing γ-butyrolactone) | Nippon Soda Co., Ltd. |
| | Photo-initiator ⑧ | CI-2855 | Sulfonium salt type (containing γ-butyrolactone) | |
| | Photo-initiator ⑨ | IRGACURE 261 | $\eta^5$-2,4-Cyclopentadien-1-yl) ((1,2,3,4,5,6-η)-(1-methylethyl)benzene)-iron(1+)-hexafluorophosphate (1−) | Ciba-Geigy (Japan) Ltd. |
| | Photo-initiator [13] | — | 4,4'-Bis(di(β-hydroxyethoxy)phenylsulfonio)phenyl sulfide bis-hexafluoroantimonate | — |
| Thermo-polymerization initiator | Heat-Initiator[14] | — | Prenyltetramethylenesulfonium hexafluoroantimonate (chemical formula (VIII)) | — |
| | Heat-Initiator[15] | — | 2-Butynyltetramethylenesulfonium hexafluoroantimonate (chemical formula (IX)) | — |

TABLE 2

List of the formulations of resin compositions

| Ex. or Com. Ex. No. | Photopolymerizable resin Oligomer No. | Proportion (wt. parts) | Photo- and thermopolymerization initiator Photo-initiator No. | Proportion (wt. parts) | Photopolymerization initiator Photo-initiator No. | Proportion (wt. parts) | Cured wall thickness (mm) (max 80 mm) |
|---|---|---|---|---|---|---|---|
| Ex. 1 | Oligomer (1) | 100 | Photo-initiator (2) | 1.75 | Photo-initiator (6) | 0.75 | 80 |
| Ex. 2 | Oligomer (2) | | | | | | |
| Ex. 3 | Oligomer (1)/ Oligomer (3) | 80/20 | | | | | |
| Ex. 4 | Oligomer (1)/ Oligomer (4) | 80/20 | | | | | |
| Ex. 5 | Oligomer (1)/ Oligomer (3)/ Oligomer (5) | 50/20/30 | | | | | |
| Ex. 6 | Oligomer (1)/ Oligomer (3)/ Oligomer (6) | 50/20/30 | | | | | |
| Ex. 7 | Oligomer (1)/ Oligomer (3)/ Oligomer (7) | 30/50/20 | | | | | |
| Ex. 8 | Oligomer (8) | 100 | | | | | |
| Ex. 9 | Oligomer (9) | | | | | | |
| Ex. 10 | Oligomer (10) | | | | | | |
| Ex. 11 | Oligomer (9)/ Oligomer (11) | 80/20 | | | | | |
| Ex. 12 | Oligomer (9)/ Oligomer (12) | 80/20 | | | | | |
| Ex. 13 | Oligomer (13) | 100 | | | | | |
| Ex. 14 | Oligomer (14) | | | | | | |
| Ex. 15 | Oligomer (15) | | | | | | |
| Ex. 16 | Oligomer (16) | | | | | | |
| Ex. 17 | Oligomer (17) | | | | | | |
| Ex. 18 | Oligomer (18) | | | | | | |
| Ex. 19 | Oligomer (19) | | | | | | |
| Ex. 20 | Oligomer (20) | | | | | | |
| Ex. 21 | Oligomer (1) | | | | | | |
| Ex. 22 | Oligomer (2) | | | | | | |
| Ex. 23 | Oligomer (3) | | | | | | |
| Ex. 24 | Oligomer (4) | | | | | | |
| Ex. 25 | Oligomer (5) | | | | | | |
| Ex. 26 | Oligomer (6) | | | | | | |
| Ex. 27 | Oligomer (7) | | | | | | |
| Ex. 28 | Oligomer (8) | | | | | | |
| Ex. 29 | Oligomer (9) | | | | | | |
| Ex. 30 | Oligomer | | | | | | |
| Ex. 31 | Oligomer | | | | | | |
| Ex. 32 | Oligomer (13)/ Oligomer (1) | 95/5 | Photo-initiator (2) | 1.75 | Photo-initiator (6) | 0.75 | 80 |
| Ex. 33 | Oligomer (13)/ Oligomer (1) | 75/25 | | | | | |
| Ex. 34 | Oligomer (13)/ Oligomer (12) | 80/20 | | | | | |
| Ex. 35 | Oligomer (13)/ Oligomer (12) | 50/50 | | | | | |
| Ex. 36 | Oligomer (1) | 100 | Photo-initiator (1) | | | | |
| Ex. 37 | | | Photo-initiator (3) | | | | |
| Ex. 38 | | | Photo-initiator (4) | | | | |
| Ex. 39 | | | Photo-initiator (5) | | | | |
| Ex. 40 | | | Photo-initiator (2) | | Photo-initiator (7) | | |
| Ex. 51 | | | | | Photo-initiator (8) | | |
| Ex. 52 | | | | | Photo-initiator (9) | | |
| Ex. 53 | Oligomer (13) | | Photo-initiator (1) | | Photo-initiator (6) | | |
| Ex. 54 | | | Photo-initiator (3) | | | | |
| Ex. 55 | | | Photo-initiator (4) | | | | |
| Ex. 56 | | | Photo-initiator (5) | | | | |
| Ex. 57 | | | Photo-initiator (2) | | Photo-initiator (7) | | |
| Ex. 58 | | | Photo-initiator (2) | | Photo-initiator (8) | | |
| Ex. 59 | | | Photo-initiator (2) | | Photo-initiator (9) | | |
| Ex. 60 | Oligomer (1) | | Photo-initiator (2)/ Photo-initiator (3) | 1.00/0.75 | Photo-initiator (6)/ Photo-initiator (7) | 0.50/0.25 | |
| Com. Ex. 1 | Oligomer (1) | 100 | Photo-initiator (1) | 2.50 | — | | 1 |
| Com. Ex. 2 | | | Photo-initiator (2) | | | | |
| Com. Ex. 3 | | | Photo-initiator (3) | | | | |

TABLE 2-continued

List of the formulations of resin compositions

| Ex. or Com. Ex. No. | Photopolymerizable resin | | Photo- and thermopolymerization initiator | | Photopolymerization initiator | | Cured wall thickness (mm) |
|---|---|---|---|---|---|---|---|
| | Oligomer No. | Proportion (wt. parts) | Photo-initiator No. | Proportion (wt. parts) | Photo-initiator No. | Proportion (wt. parts) | (max 80 mm) |
| Com. Ex. 4 | | | Photo-initiator ④ | | | | 2 |
| Com. Ex. 5 | | | Photo-initiator ⑤ | | | | |
| Com. Ex. 6 | | | — | | Photo-initiator ⑥ | 2.50 | 2 |
| Com. Ex. 7 | | | | | Photo-initiator ⑦ | | 1 |
| Com. Ex. 8 | | | | | Photo-initiator ⑧ | | |
| Com. Ex. 9 | | | | | Photo-initiator ⑨ | | 2 |
| Com. Ex. 10 | | | Photo-initiator ② | 0.75 | Photo-initiator ⑥ | 1.75 | 1 |
| Com. Ex. 11 | Oligomer ⑬ | | Photo-initiator ① | 2.50 | — | | 1 |
| Com. Ex. 12 | | | Photo-initiator ② | | | | |
| Com. Ex. 13 | | | Photo-initiator ③ | | | | |
| Com. Ex. 14 | | | Photo-initiator ④ | | | | |
| Com. Ex. 15 | | | Photo-initiator ⑤ | | | | |
| Com. Ex. 16 | | | — | | Photo-initiator ⑥ | 2.50 | |
| Com. Ex. 17 | | | | | Photo-initiator ⑦ | | |
| Com. Ex. 18 | | | | | Photo-initiator ⑧ | | |
| Com. Ex. 19 | | | | | Photo-initiator ⑨ | | |
| Com. Ex. 20 | | | Photo-initiator ② | 0.75 | Photo-initiator ⑥ | 1.75 | |

TABLE 3

List of the formulations of two-component photo-initiators and ratings for the cured state

| | | Photo-initiator ⑥ (wt. parts) | | | | | |
|---|---|---|---|---|---|---|---|
| | | 0.4 | 0.5 | 0.6 | 0.7 | 0.8 | 0.9 |
| Photo-initiator ② (wt. Parts) | 0.4 | Ex. 61 | Ex. 75 | Com. Ex. 36 | Com. Ex. 43 | Com. Ex. 50 | Com. Ex. 57 |
| | Cured state | ● | ● | x | x | x | x |
| | 0.5 | Ex. 62 | Ex. 76 | Ex. 90 | Com. Ex. 44 | Com. Ex. 51 | Com. Ex. 58 |
| | Cured state | ● | ● | ● | x | x | x |
| | 0.6 | Ex. 63 | Ex. 77 | Ex. 91 | Com. Ex. 105 | Com. Ex. 52 | Com. Ex. 59 |
| | Cured state | ● | ● | ● | ● | x | x |
| | 0.7 | Ex. 64 | Ex. 78 | Ex. 92 | Ex. 106 | Ex. 120 | Com. Ex. 60 |
| | Cured state | ⊙ | ● | ● | ● | ● | x |
| | 0.8 | Ex. 65 | Ex. 79 | Ex. 93 | Ex. 107 | Ex. 121 | Ex. 135 |
| | Cured state | ⊙ | ⊙ | ⊙ | ● | ● | ● |
| | 0.9 | Ex. 66 | Ex. 80 | Ex. 94 | Ex. 108 | Ex. 122 | Ex. 136 |
| | Cured state | ⊙ | ⊙ | ⊙ | ⊙ | ● | ● |
| | 1.0 | Ex. 67 | Ex. 81 | Ex. 95 | Ex. 109 | Ex. 123 | Ex. 137 |
| | Cured state | ⊙ | ⊙ | ⊙ | ⊙ | ⊙ | ● |
| | 1.1 | Ex. 68 | Ex. 82 | Ex. 96 | Ex. 110 | Ex. 124 | Ex. 138 |
| | Cured state | ⊙ | ⊙ | ⊙ | ⊙ | ⊙ | ⊙ |
| | 1.2 | Ex. 69 | Ex. 83 | Ex. 97 | Ex. 111 | Ex. 125 | Ex. 139 |
| | Cured state | ⊙ | ⊙ | ⊙ | ⊙ | ⊙ | ⊙ |
| | 1.3 | Ex. 70 | Ex. 84 | Ex. 98 | Ex. 112 | Ex. 126 | Ex. 140 |
| | Cured state | ⊙ | ⊙ | ⊙ | ⊙ | ⊙ | ⊙ |
| | 1.4 | Ex. 71 | Ex. 85 | Ex. 99 | Ex. 113 | Ex. 127 | Ex. 141 |
| | Cured state | ⊙ | ⊙ | ⊙ | ⊙ | ⊙ | ⊙ |
| | 1.5 | Ex. 72 | Ex. 86 | Ex. 100 | Ex. 114 | Ex. 128 | Ex. 142 |
| | Cured state | ⊙ | ⊙ | ⊙ | ⊙ | ⊙ | ⊙ |
| | 1.6 | Ex. 73 | Ex. 87 | Ex. 101 | Ex. 115 | Ex. 129 | Ex. 143 |
| | Cured state | ⊙ | ⊙ | ⊙ | ⊙ | ⊙ | ⊙ |
| | 1.7 | Ex. 74 | Ex. 88 | Ex. 102 | Ex. 116 | Ex. 130 | Ex. 144 |
| | Cured state | ○ | ⊙ | ⊙ | ⊙ | ⊙ | ⊙ |
| | 1.8 | Com. Ex. 21 | Ex. 89 | Ex. 103 | Ex. 117 | Ex. 131 | Ex. 145 |
| | Cured state | ▲ | ○ | ⊙ | ⊙ | ⊙ | ⊙ |
| | 1.9 | Com. Ex. 22 | Com. Ex. 29 | Ex. 104 | Ex. 118 | Ex. 132 | Ex. 146 |
| | Cured state | ▲ | ▲ | ○ | ⊙ | ⊙ | ⊙ |
| | 2.0 | Com. Ex. 23 | Com. Ex. 30 | Com. Ex. 37 | Ex. 119 | Ex. 133 | Ex. 147 |
| | Cured state | ▲ | ▲ | ▲ | ○ | ⊙ | ⊙ |
| | 2.2 | Com. Ex. 24 | Com. Ex. 31 | Com. Ex. 38 | Com. Ex. 45 | Ex. 134 | Ex. 148 |
| | Cured state | ▲ | ▲ | ▲ | ▲ | ○ | ○ |
| | 2.4 | Com. Ex. 25 | Com. Ex. 32 | Com. Ex. 39 | Com. Ex. 46 | Com. Ex. 53 | Com. Ex. 61 |
| | Cured state | ▲ | ▲ | ▲ | ▲ | ▲ | ▲ |
| | 2.6 | Com. Ex. 26 | Com. Ex. 33 | Com. Ex. 40 | Com. Ex. 47 | Com. Ex. 54 | Com. Ex. 62 |
| | Cured state | ▲ | ▲ | ▲ | ▲ | ▲ | ▲ |
| | 2.8 | Com. Ex. 27 | Com. Ex. 34 | Com. Ex. 41 | Com. Ex. 48 | Com. Ex. 55 | Com. Ex. 63 |

TABLE 3-continued

List of the formulations of two-component photo-initiators and ratings for the cured state

| | Cured state 3.0 Cured state | ▲ Com. Ex. 28 ▲ | ▲ Com. Ex. 35 ▲ | ▲ Com. Ex. 42 ▲ | ▲ Com. Ex. 49 ▲ | ▲ Com. Ex. 56 ▲ | ▲ Com. Ex. 64 ▲ |
|---|---|---|---|---|---|---|---|
| | | | Photo-initiator ⑥ (wt. parts) | | | | |
| | | 1.0 | 1.1 | 1.2 | 1.3 | 1.4 | |
| Photo-initiator ② (wt. Parts) | 0.4 Cured state | Com. Ex. 65 x | Com. Ex. 74 x | Com. Ex. 83 x | Com. Ex. 93 x | Com. Ex. 104 x | |
| | 0.5 Cured state | Com. Ex. 66 x | Com. Ex. 75 x | Com. Ex. 84 x | Com. Ex. 94 x | Com. Ex. 105 x | |
| | 0.6 Cured state | Com. Ex. 67 x | Com. Ex. 76 x | Com. Ex. 85 x | Com. Ex. 95 x | Com. Ex. 106 x | |
| | 0.7 Cured state | Com. Ex. 68 x | Com. Ex. 77 x | Com. Ex. 86 x | Com. Ex. 96 x | Com. Ex. 107 x | |
| | 0.8 Cured state | Com. Ex. 69 x | Com. Ex. 78 x | Com. Ex. 87 x | Com. Ex. 97 x | Com. Ex. 108 x | |
| | 0.9 Cured state | Ex. 149 ● | Com. Ex. 79 x | Com. Ex. 88 x | Com. Ex. 98 x | Com. Ex. 109 x | |
| | 1.0 Cured state | Ex. 150 ● | Ex. 162 ● | Com. Ex. 89 x | Com. Ex. 99 x | Com. Ex. 110 x | |
| | 1.1 Cured state | Ex. 151 ● | Ex. 163 ● | Ex. 175 ● | Com. Ex. 100 x | Com. Ex. 111 x | |
| | 1.2 Cured state | Ex.152 ⊙ | Ex. 164 ⊙ | Ex. 176 ● | Ex. 187 ● | Com. Ex. 112 x | |
| | 1.3 Cured state | Ex. 153 ⊙ | Ex. 165 ⊙ | Ex. 177 ⊙ | Ex. 188 ● | Ex. 198 ● | |
| | 1.4 Cured state | Ex. 154 ⊙ | Ex. 166 ⊙ | Ex. 178 ⊙ | Ex. 189 ⊙ | Ex. 199 ⊙ | |
| | 1.5 Cured state | Ex. 155 ⊙ | Ex. 167 ⊙ | Ex. 179 ⊙ | Ex. 190 ⊙ | Ex. 200 ⊙ | |
| | 1.6 Cured state | Ex. 156 ⊙ | Ex. 168 ⊙ | Ex. 180 ⊙ | Ex. 191 ⊙ | Ex. 201 ⊙ | |
| | 1.7 Cured state | Ex. 157 ⊙ | Ex. 169 ⊙ | Ex. 181 ⊙ | Ex. 192 ⊙ | Ex. 202 ⊙ | |
| | 1.8 Cured state | Ex. 158 ⊙ | Ex. 170 ⊙ | Ex. 182 ⊙ | Ex. 193 ⊙ | Ex. 203 ⊙ | |
| | 1.9 Cured state | Ex. 159 ⊙ | Ex. 171 ⊙ | Ex. 183 ⊙ | Ex. 194 ⊙ | Ex. 204 ⊙ | |
| | 2.0 Cured state | Ex. 160 ⊙ | Ex. 172 ⊙ | Ex. 184 ⊙ | Ex. 195 ⊙ | Ex. 205 ⊙ | |
| | 2.2 Cured state | Ex. 161 ○ | Ex. 173 ⊙ | Ex. 185 ⊙ | Ex. 196 ⊙ | Ex. 206 ⊙ | |
| | 2.4 Cured state | Com. Ex. 70 ▲ | Ex. 174 ○ | Ex. 186 ○ | Ex. 197 ○ | Ex. 207 ○ | |
| | 2.6 Cured state | Com. Ex. 71 ▲ | Com. Ex. 80 ▲ | Com. Ex. 90 ▲ | Com. Ex. 101 ▲ | Com. Ex. 113 ▲ | |
| | 2.8 Cured state | Com. Ex. 72 ▲ | Com. Ex. 81 ▲ | Com. Ex. 91 ▲ | Com. Ex. 102 ▲ | Com. Ex. 114 ▲ | |
| | 3.0 Cured state | Com. Ex. 73 ▲ | Com. Ex. 82 ▲ | Com. Ex. 92 ▲ | Com. Ex. 103 ▲ | Com. Ex. 115 ▲ | |
| | | | Photo-initiator ⑥ (wt. parts) | | | | |
| | | 1.5 | 1.7 | 1.8 | 2.0 | 2.2 | |
| Photo-initiator ② (wt. Parts) | 0.4 Cured state | Com. Ex. 116 x | Com. Ex. 129 x | Com. Ex. 143 x | Com. Ex. 157 x | Com. Ex. 172 x | |
| | 0.5 Cured state | Com. Ex. 117 x | Com. Ex. 130 x | Com. Ex. 144 x | Com. Ex. 158 x | Com. Ex. 173 x | |
| | 0.6 Cured state | Com. Ex. 118 x | Com. Ex. 131 x | Com. Ex. 145 x | Com. Ex. 159 x | Com. Ex. 174 x | |
| | 0.7 Cured state | Com. Ex. 119 x | Com. Ex. 132 x | Com. Ex. 146 x | Com. Ex. 160 x | Com. Ex. 175 x | |
| | 0.8 Cured state | Com. Ex. 120 x | Com. Ex. 133 x | Com. Ex. 147 x | Com. Ex. 161 x | Com. Ex. 176 x | |
| | 0.9 Cured state | Com. Ex. 121 x | Com. Ex. 134 x | Com. Ex. 148 x | Com. Ex. 162 x | Com. Ex. 177 x | |
| | 1.0 Cured state | Com. Ex. 122 x | Com. Ex. 135 x | Com. Ex. 149 x | Com. Ex. 163 x | Com. Ex. 178 x | |
| | 1.1 Cured state | Com. Ex. 123 x | Com. Ex. 136 x | Com. Ex. 150 x | Com. Ex. 164 x | Com. Ex. 179 x | |
| | 1.2 Cured state | Com. Ex. 124 x | Com. Ex. 137 x | Com. Ex. 151 x | Com. Ex. 165 x | Com. Ex. 180 x | |
| | 1.3 Cured state | Com. Ex. 125 x | Com. Ex. 138 x | Com. Ex. 152 x | Com. Ex. 166 x | Com. Ex. 181 x | |

TABLE 3-continued

List of the formulations of two-component photo-initiators and ratings for the cured state

| 1.4 | Ex. 208 | Com. Ex. 139 | Com. Ex. 153 | Com. Ex. 167 | Com. Ex. 182 |
|---|---|---|---|---|---|
| Cured state | ● | x | x | x | x |
| 1.5 | Ex. 209 | Com. Ex. 140 | Com. Ex. 154 | Com. Ex. 168 | Com. Ex. 183 |
| Cured state | ◉ | x | x | x | x |
| 1.6 | Ex. 210 | Ex. 217 | Com. Ex. 155 | Com. Ex. 169 | Com. Ex. 184 |
| Cured state | ◉ | ● | x | x | x |
| 1.7 | Ex. 211 | Ex. 218 | Ex. 225 | Com. Ex. 170 | Com. Ex. 185 |
| Cured state | ◉ | ◉ | ● | x | x |
| 1.8 | Ex. 212 | Ex. 219 | Ex. 226 | Ex. 233 | Com. Ex. 186 |
| Cured state | ◉ | ◉ | ◉ | ● | x |
| 1.9 | Ex. 213 | Ex. 220 | Ex. 227 | Ex. 234 | Com. Ex. 187 |
| Cured state | ◉ | ◉ | ◉ | ● | x |
| 2.0 | Ex. 214 | Ex. 221 | Ex. 228 | Ex. 235 | Ex. 240 |
| Cured state | ◉ | ◉ | ◉ | ◉ | ● |
| 2.2 | Ex. 215 | Ex. 222 | Ex. 229 | Ex. 236 | Ex. 241 |
| Cured state | ◉ | ◉ | ◉ | ◉ | ◉ |
| 2.4 | Ex. 216 | Ex. 223 | Ex. 230 | Ex. 237 | Ex. 242 |
| Cured state | ◉ | ◉ | ◉ | ◉ | ◉ |
| 2.6 | Com. Ex. 126 | Ex. 224 | Ex. 231 | Ex. 238 | Ex. 243 |
| Cured state | ▲ | ○ | ○ | ◉ | ◉ |
| 2.8 | Com. Ex. 127 | Com. Ex. 141 | Ex. 232 | Ex. 239 | Ex. 244 |
| Cured state | ▲ | ▲ | ○ | ○ | ○ |
| 3.0 | Com. Ex. 128 | Com. Ex. 142 | Com. Ex. 156 | Com. Ex. 171 | Ex. 245 |
| Cured state | ▲ | ▲ | ▲ | ▲ | ○ |

Photopolymerizable resin component: Oligomer ①, 100 parts by weight.
Rating system for the cured state: ◉ Completely cured to 80 mm; ○ Completely cured to 80 mm (but cracked); ● Cured to 80 mm (but with a low hardness); ▲ Cured to 80 mm (but formed like millet cake); x The internal part remained uncured (cured only in an about 1 mm thick surface layer).

TABLE 4

List of resin compositions and samples for measuring the resin temperature during curing

| | Composition No. |
|---|---|
| Comparative Example 24 | Composition No. ① |
| Comparative Example 37 | Composition No. ② |
| Example 130 | Composition No. ③ |
| Example 143 | Composition No. ④ |
| Example 155 | Composition No. ⑤ |
| Example 166 | Composition No. ⑥ |
| Comparative Example 89 | Composition No. ⑦ |
| Comparative Example 59 | Composition No. ⑧ |
| Example 110 | Composition No. ⑨ |
| Example 125 | Composition No. ⑩ |
| Example 182 | Composition No. ⑪ |

Example 246

The same resin composition as described in Example 1(A) was prepared, and a sample was constructed in the same manner as described in Example 1(B).

This sample was irradiated with UV radiation under the same conditions as described in Example 1(C), except that the irradiation distance was 25 cm.

After UV irradiation, the resin within the glass vessel was completely cured in several minutes. The wall thickness of the resin was 80 mm (the greatest measurable value) which was the limit defined by the glass vessel (see FIG. 11).

Example 247

The same resin composition as described in Example 1(A) was prepared, and a sample was constructed in the same manner as described in Example 1(B).

This sample was irradiated with UV radiation under the same conditions as described in Example 1(C), except that the irradiation distance was 20 cm.

After UV irradiation, the resin within the glass vessel was completely cured in several minutes. The wall thickness of the resin was 80 mm (the greatest measurable value) which was the limit defined by the glass vessel (see FIG. 11).

Example 248

The same resin composition as described in Example 1(A) was prepared, and a sample was constructed in the same manner as described in Example 1(B).

This sample was irradiated with UV radiation under the same conditions as described in Example 1(C), except that the irradiation distance was 15 cm.

After UV irradiation, the resin within the glass vessel was completely cured in several minutes. The wall thickness of the resin was 80 mm (the greatest measurable value) which was the limit defined by the glass vessel (see FIG. 11).

Example 249

The same resin composition as described in Example 1(A) was prepared, and a sample was constructed in the same manner as described in Example 1(B).

(D) This sample was irradiated with UV radiation under the following conditions.
Ultraviolet irradiator: UVL-3500 M2 (manufactured by Ushio Inc.)
Type of lamp: Metal halide lamp.
Intensity of lamp: 120 W/cm.
Length of lamp: 250 mm.
Atmosphere, temperature and pressure: Air, room temperature and atmospheric pressure.
Irradiation distance: 19 cm.
Irradiation time: 60 seconds.

After UV irradiation, the resin within the glass vessel was completely cured in several minutes. The wall thickness of the resin was 80 mm (the greatest measurable value) which was the limit defined by the glass vessel.

Example 250

The same resin composition as described in Example 1(A) was prepared, and a sample was constructed in the same manner as described in Example 1(B).

This sample was irradiated with UV radiation under the same conditions as described in Example 247(D), except that the intensity of the lamp was 200 W/cm.

After UV irradiation, the resin within the glass vessel was completely cured in several minutes. The wall thickness of the resin was 80 mm (the greatest measurable value) which was the limit defined by the glass vessel.

Example 251

The same resin composition as described in Example 1(A) was prepared, and a sample was constructed in the same manner as described in Example 1(B).

This sample was irradiated with UV radiation under the same conditions as described in Example 247(D), except that the intensity of the lamp was 280 W/cm.

After UV irradiation, the resin within the glass vessel was completely cured in several minutes. The wall thickness of the resin was 80 mm (the greatest measurable value) which was the limit defined by the glass vessel.

Example 252

(E) The same resin composition as described in Example 1(A) was prepared and used as a matrix resin. Then, prepregs were made by impregnating 18 cm×18 pieces of CF cloth with this matrix resin.

Figure 12:
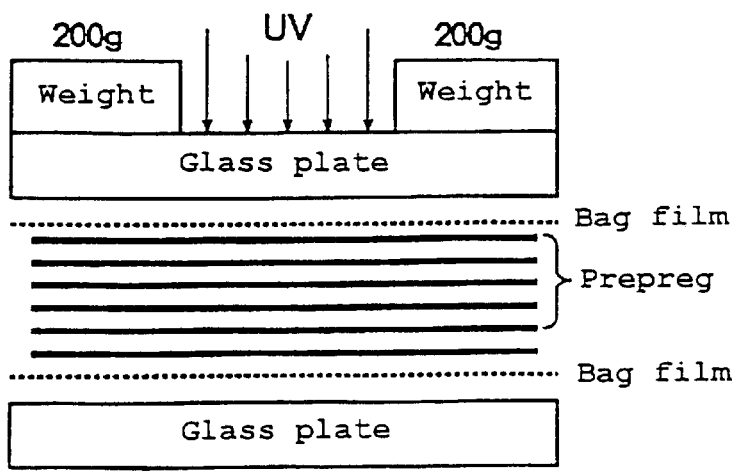
FIG. 12 is an explanatory view illustrating the manner in which a prepreg laminate sample is made in accordance with the present invention.

(E) A prepreg laminate sample was made by stacking 40 such prepregs (to a thickness of about 8 mm), interposing them between glass plates through the medium of bag films, and applying weight thereto from above (FIG. 12).

This sample was irradiated with UV radiation under the same conditions as described in Example 1(C), except that the irradiation time was 3 minutes and the irradiation distance was 15 cm.

After UV irradiation, the laminate was completely cured to give a satisfactory CFRP (the related data are shown in Table 5).

TABLE 5

Data on Properties of FRPs

| Item | GFRP | CFRP |
|---|---|---|
| Tensile strength (kgf/cm$^2$) | 3100 | 7100 |
| Bending strength (kgf/cm$^2$) | 3400 | 3000 |
| Fiber content (wt. %) | 59.2 | 52.3 |
| Fiber content (vol. %) | 38.0 | 41.7 |
| Specific gravity (g/cm$^3$) | 1.71 | 1.43 |
| Void fraction (vol. %) | 1.99 | 0.73 |
| Heat resistance (Tg: °C.) | 150 | 150 |
| Torsional elastic modulus (GPa) | 2.2 | 2.2 |

Example 253

A prepreg laminate sample (with a thickness of about 8 mm) was made in the same manner as described in Example 252(E), except that 18×18 of GF cloth were used as the reinforcing fibrous material.

This sample was irradiated with UV radiation under the same conditions as described in Example 252.

After UV irradiation, the laminate was completely cured to give a satisfactory GFRP (the related data are shown in Table 5).

Example 254

A prepreg laminate sample was made in the same manner as described in Example 252(E), except that 100 prepregs were stacked (to a thickness of about 20 mm)

This sample was irradiated with UV radiation under the same conditions as described in Example 252.

After UV irradiation, the laminate was completely cured to give a satisfactory CFRP.

Example 255

A prepreg laminate sample was made in the same manner as described in Example 252(E), except that the resin composition of Example 13 was used as the matrix resin.

This sample was irradiated with UV radiation under the same conditions as described in Example 252.

After UV irradiation, the laminate was completely cured to give a satisfactory CFRP.

Example 256

A prepreg laminate sample was made in the same manner as described in Example 252(E).

An electron beam (EB) was used as the energy radiation. The EB irradiation was carried out under the following conditions.

Irradiator: Linac (High Voltage Alco, Ltd.).
Beam energy: 10 MeV.
Scanning frequency: 4 Hz.
Pulse repetition rate: 60 Hz.
Scanning width: 20 cm.
Pulse width: 4 μsec.
Radiation dose: 50 kGy.

After UV irradiation, the laminate was completely cured to give a satisfactory CFRP.

Example 257

(F) A matrix resin was prepared in the same manner as described in Example 252(E). Carbon fiber was impregnated with this matrix resin and then wound at a winding speed of 30 cm/sec (according to a filament winding technique) to form a cylindrical laminate material made of CFRP (with a wall thickness of 3 mm).

After completion of the winding, the cylindrical laminate material was irradiated with UV radiation from all directions (under the same conditions as described in Example 252).

After UV irradiation, the laminate material was completely cured to give a satisfactory filament-wound CFRP.

Example 258

A cylindrical laminate material made of CFRP (with a wall thickness of 3 mm) was formed in the same manner as described in Example 257(F), except that glass fiber was used as the reinforcing fiber.

After completion of the winding, the cylindrical laminate material was irradiated with UV radiation from all directions (under the same conditions as described in Example 252).

After UV irradiation, the laminate material was completely cured to give a satisfactory filament-wound GFRP.

Example 259

Using a resin composition prepared by mixing 100 parts by weight of Celoxide 2021P (oligomer ①; an alicyclic epoxy resin manufactured by Daicel Chemical Industries Ltd.; 3,4-cyclohexylmethyl 3,4-epoxycyclohexanecarboxylate) with 1.50 parts by weight of San Aid SI-80L {photo-initiator ②; a cationic photo- and thermopolymerization initiator manufactured by Sanshin Chemical Co., Ltd.; general formula (II)}, 0.50 part by weight of DAICAT 11 (photo-initiator ⑥; a cationic photopolymerization initiator manufactured by Daicel Chemical Industries Ltd.; an arylsulfonium salt), 0.50 part by weight of 4,4'-bis(di(β-hydroxyethoxy)phenylsulfonio)phenyl sulfide bis-hexafluoroantimonate (photo-initiator ⑬), and 0.50 part by weight of 2-butynyltetramethylenesulfonium hexafluoroantimonate {photo-initiator ⑮; general formula (IX)}, a test was carried out under the same conditions as described in Example 1.

After UV irradiation, the resin within the glass vessel was completely cured in several minutes. The wall thickness of the resin was 80 mm (the greatest measurable value) which was the limit defined by the glass vessel.

Example 260

Using a resin composition prepared by mixing 100 parts by weight of Celoxide 2021P (oligomer ①; an alicyclic epoxy resin manufactured by Daicel Chemical Industries Ltd.; 3,4-cyclohexylmethyl 3,4-epoxycyclohexanecarboxylate) with 1.50 parts by weight of San Aid SI-80L {photo-initiator ②; a cationic photo- and thermopolymerization initiator manufactured by Sanshin Chemical Co., Ltd.; general formula (II)}, 1.00 part by weight of DAICAT 11 (photo-initiator ⑥; a cationic photopolymerization initiator manufactured by Daicel Chemical Industries Ltd.; an arylsulfonium salt), and 0.50 part by weight of prenyltetramethylenesulfonium hexafluoroantimonate {photo-initiator ⑭; general formula (VIII)}, a test was carried out under the same conditions as described in Example 1.

After UV irradiation, the resin within the glass vessel was completely cured in several minutes. The wall thickness of the resin was 80 mm (the greatest measurable value) which was the limit defined by the glass vessel.

Comparative Examples 188 to 190

Tests were carried out in all the same manner as described in Examples 246 to 248, except that the composition of Comparative Example 1 was used as the resin composition.

Figure 11:
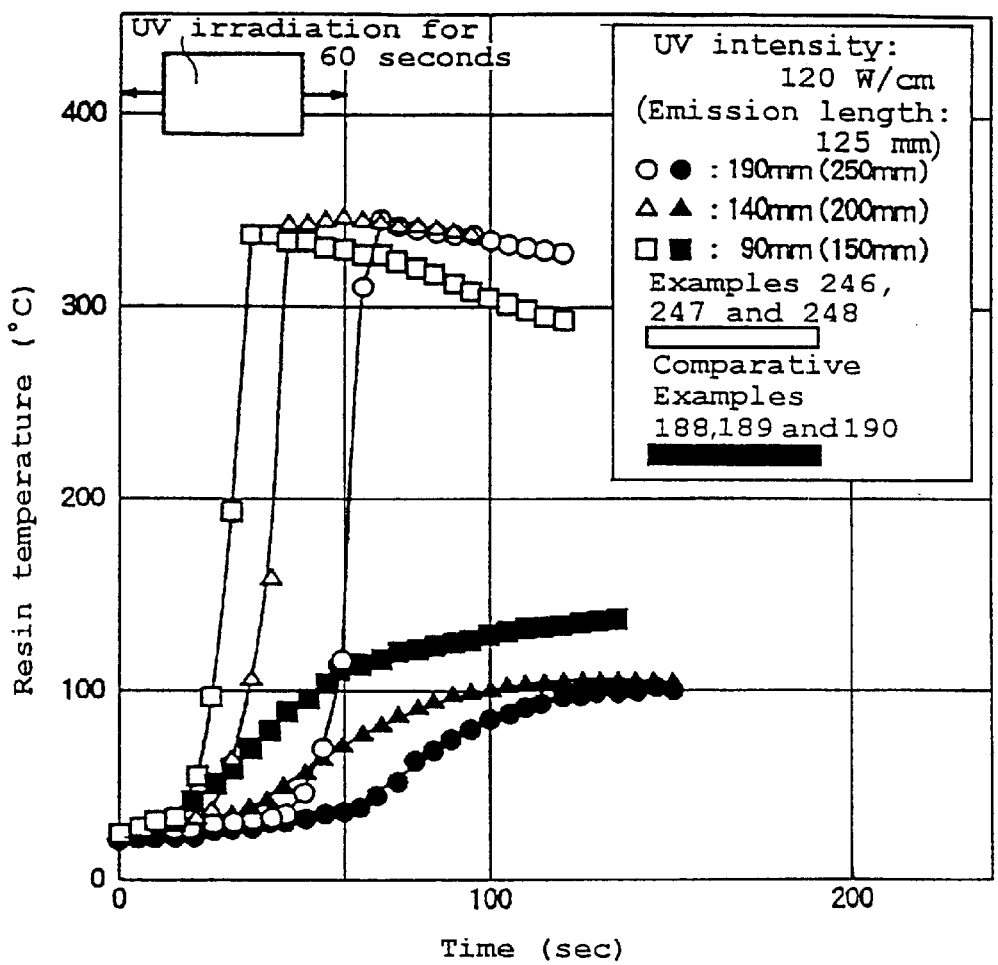
FIG. 11 is a graph showing the relationship between the UV irradiation distance and the resin temperature after UV irradiation for 60 seconds in the practice of the present invention.

After UV irradiation, the wall thickness of the resin was about 1 mm, and its inner part remained uncured (see FIG. 11).

Comparative Example 191

A prepreg laminate sample was made in the same manner as described in Example 252(E), except that the resin composition of Comparative Example 1 was used as the matrix resin.

This sample was irradiated with UV radiation under the same conditions as described in Example 252.

After UV irradiation, the CFRP was cured only in the first surface layer on the irradiated side, and the inner part of the resin remained entirely uncured.

Comparative Example 192

A prepreg laminate sample was made in the same manner as described in Example 253, except that the resin composition of Comparative Example 1 was used as the matrix resin.

This sample was irradiated with UV radiation under the same conditions as described in Example 252.

After UV irradiation, the GFRP was cured only up to the second or third layer on the irradiated side, and the inner part of the resin remained entirely uncured.

Examples 261 to 282

Tests were carried out under the same conditions as described in Example 1, except that the resin compositions shown in Table 1 were used and tested according to the formulations shown in Tables 6 (continued from Table 2). The test results thus obtained are shown in Table 6.

TABLE 6

List of the formulations of resin compositions (continued from Table 2)

| Ex. or Com. Ex. No. | Photopolymerizable resin | | Photo- and thermopolymerization initiator | | Photo- and thermopolymerization initiator | | Cured wall thickness (mm) |
|---|---|---|---|---|---|---|---|
| | Oligomer No. | Proportion (wt. parts) | Photo-initiator No. | Proportion (wt. parts) | Photo-initiator No. | Proportion (wt. parts) | (max 80 mm) |
| Ex. 261 | Oligomer ⑬/ Oligomer ① | 50/50 | Photo-initiator ② | 1.75 | Photo-initiator ⑥ | 0.75 | 80 |
| Ex. 262 | Oligomer ⑭/ Oligomer ① | | | | | | |
| Ex. 263 | Oligomer ⑮/ Oligomer ① | | | | | | |
| Ex. 264 | Oligomer ⑯/ Oligomer ① | | | | | | |
| Ex. 265 | Oligomer ⑰/ Oligomer ① | | | | | | |
| Ex. 266 | Oligomer ⑱/ Oligomer ① | | | | | | |
| Ex. 267 | Oligomer ⑲/ Oligomer ① | | | | | | |
| Ex. 268 | Oligomer ⑳/ Oligomer ① | | | | | | |
| Ex. 269 | Oligomer [1]/ Oligomer ① | | | | | | |
| Ex. 270 | Oligomer [2]/ Oligomer ① | | | | | | |
| Ex. 271 | Oligomer [3]/ Oligomer ① | | | | | | |
| Ex. 272 | Oligomer [4]/ Oligomer ① | | | | | | |

TABLE 6-continued

List of the formulations of resin compositions (continued from Table 2)

| Ex. or Com. Ex. No. | Photopolymerizable resin Oligomer No. | Proportion (wt. parts) | Photo- and thermopolymerization initiator Photo-initiator No. | Proportion (wt. parts) | Photo- and thermopolymerization initiator Photo-initiator No. | Proportion (wt. parts) | Cured wall thickness (mm) (max 80 mm) |
|---|---|---|---|---|---|---|---|
| Ex. 273 | Oligomer [5]/ Oligomer ① | | | | | | |
| Ex. 274 | Oligomer [6]/ Oligomer ① | | | | | | |
| Ex. 275 | Oligomer [7]/ Oligomer ① | | | | | | |
| Ex. 276 | Oligomer [8]/ Oligomer ① | | | | | | |
| Ex. 277 | Oligomer [9]/ Oligomer ① | | | | | | |
| Ex. 278 | Oligomer [10]/ Oligomer ① | | | | | | |
| Ex. 279 | Oligomer [11]/ Oligomer ① | | | | | | |
| Ex. 280 | Oligomer ① | 100 | Photo-initiator ⑩ | | | | |
| Ex. 281 | | | Photo-initiator ⑪ | | | | |
| Ex. 282 | | | Photo-initiator ⑫ | | | | |

Example 283

The same resin composition as described in Example 1(A) was prepared, and a sample was constructed in the same manner as described in Example 1(B).

The constructed sample was heated in an oven kept at 150° C., instead of being irradiated with energy radiation.

The resin within the glass vessel was completely cured in a little less than 10 minutes after the start of heating. The wall thickness of the resin was 80 mm (the greatest measurable value) which was the limit defined by the glass vessel.

Example 284

The same resin composition as described in Example 1(A) was prepared, and a sample was constructed in the same manner as described in Example 1(B).

The constructed sample was placed in an oven adjusted to a temperature in a range which did not cause its cure (60° C. in this example), and held therein until the resin temperature became equal to the temperature of the atmosphere within the oven. Thereafter, the sample was taken out of the oven and tested under the same conditions as described in Example 1.

After UV irradiation, the resin within the glass vessel was completely cured in several minutes (in a shorter time than in Example 1). The wall thickness of the resin was 80 mm (the greatest measurable value) which was the limit defined by the glass vessel.

Industrial Applicability

Resin Composition Capable of Inducing the Novel Resin Curing Mechanism

It can be seen from the test results of Examples 1–60, Examples 259–282 and Comparative Examples 1–20 shown in Tables 1–3 and Table 6 that the compositions of the present invention involving the novel resin curing mechanism are excellent in energy radiation curability, particularly thick-wall curability. Moreover, it can be seen from Example 284 that it is more effective for curing purposes to warm a composition of the present invention previously (in a temperature range which does not cause its cure) and then expose it to energy radiation. Furthermore, it has been confirmed by Example 283 that a composition of the present invention containing a photopolymerization initiator comprising at least two components can also be cured in a short period of time by the application of heat.

Figure 9:
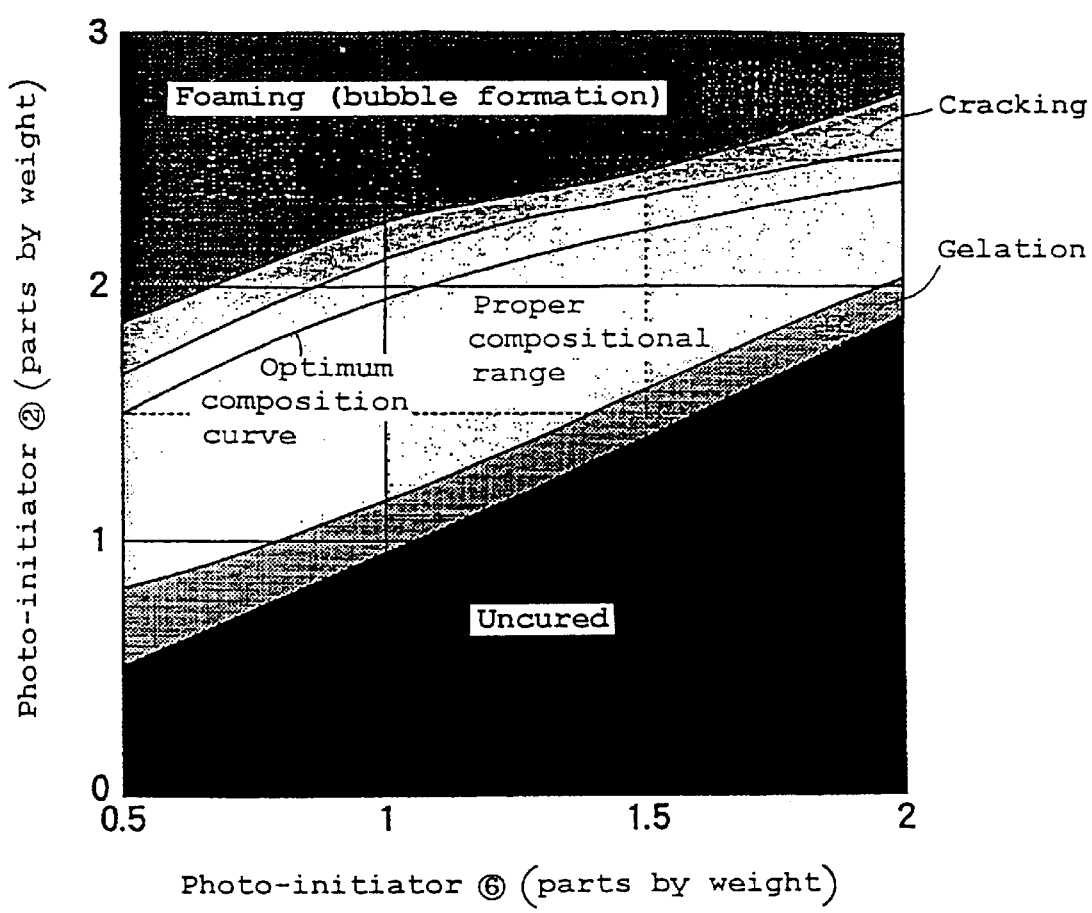
FIG. 9 is a graph showing a proper compositional range for a photopolymerization initiator system in accordance with the present invention.
Figure 10:
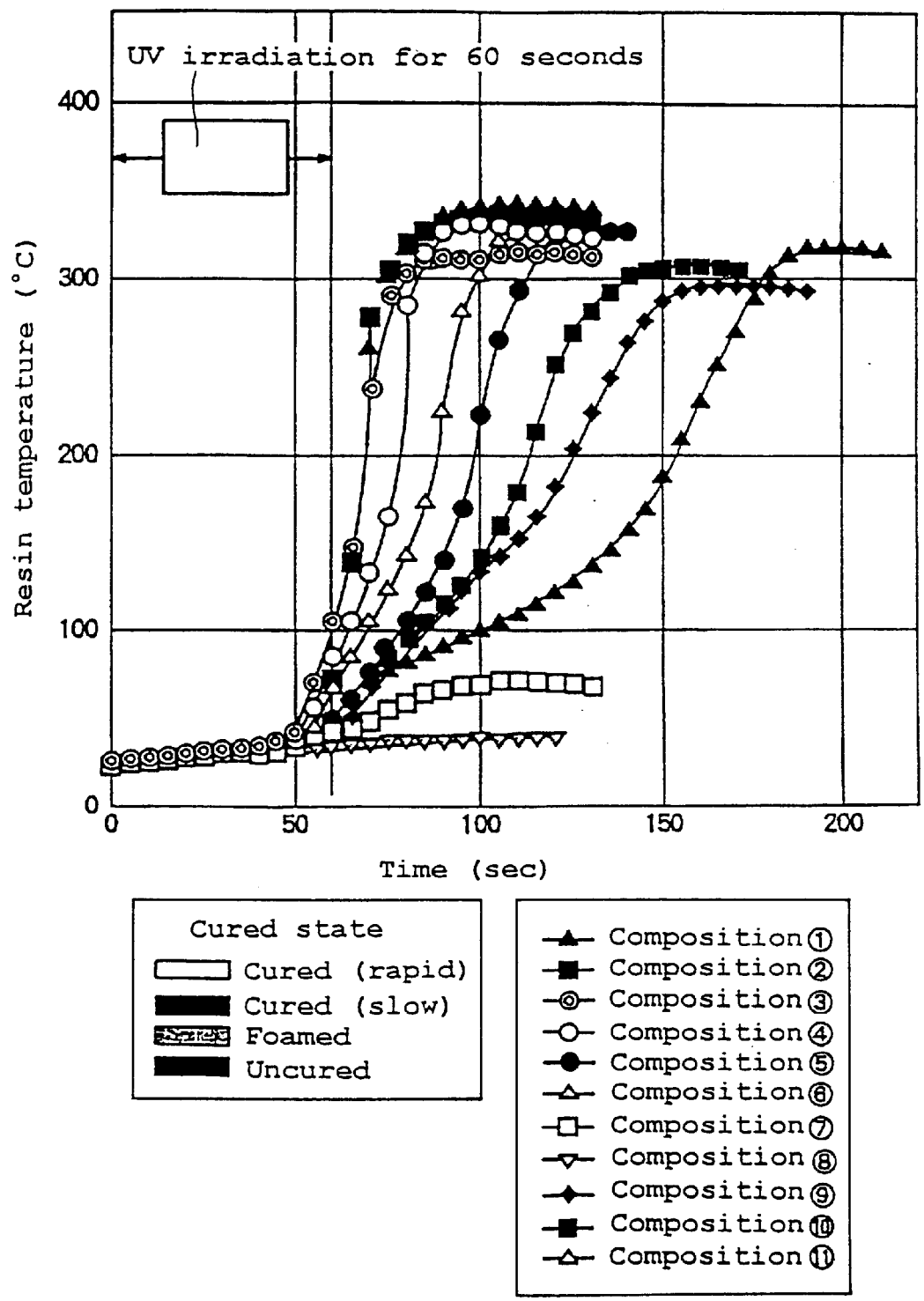
FIG. 10 is a graph showing the relationship between the time elapsed and the resin temperature after UV irradiation for 60 seconds in the practice of the present invention.

Photopolymerization Initiator Systems Comprising at Least Two Components Capable of Inducing the Novel Resin Curing Mechanism and their Proper Compositional Range The effectiveness of photopolymerization initiator systems comprising at least two components capable of inducing the novel resin curing mechanism and their proper compositional range are evident from the test results of Examples 1–245 and Comparative Examples 1–187 shown in Tables 1–3 and FIG. 9.

Verification of the Novel Resin Curing Mechanism

Among the results of Examples 1–245 and Comparative Examples 1–187, curves showing a rise in resin temperature due to the curing heat exotherm of the resin when each of the compositions shown in Table 4 was exposed to energy radiation are depicted in FIG. 10. Moreover, curves showing a rise in resin temperature due to the curing exotherm of the resin when each of the compositions of Examples 246–248 and Comparative Examples 188–190 was exposed to energy radiation are depicted in FIG. 11. It is evident from FIGS. 10 and 11 that the resin compositions of the present invention are cured on the basis of the novel resin curing mechanism in which energy other than the energy from the energy radiation source, i.e. heat energy arising from the heat of curing reaction (curing exotherm) in this case, is autogenously generated within the resin, so that the resin composition is cured by means of both the heat energy arising from the curing reaction and the energy from the energy radiation source.

Moreover, it can be confirmed by the test results of Examples 246–251 that the novel resin curing mechanism of the present invention is effective even if the conditions of irradiation with energy radiation are varied.

Verification of the Curability of CFRPs (Thick-Walled Resins Containing an Energy Radiation Screening Substance) and GFRPs It is evident from the results of Examples 252–258 and Comparative Examples 191–192 that the photo-curing (energy radiation curing) of CFRPs (thick-walled resins containing an energy radiation screening substance) and the photo-curing (energy radiation curing) of GFRPs and the like, which have been impossible with conventional photo-curable resins, can be achieved by the novel resin curing mechanism of the present invention and the photopolymerization initiator systems comprising at least two components and resin compositions which are capable of inducing this mechanism.

Moreover, it can be confirmed by Example 256 that the novel resin curing mechanism of the present invention, the photopolymerization initiator systems comprising at least two components and resin compositions which are capable of inducing this mechanism, and the method of making FRPs (CFRPs) in accordance with the present invention may also be applied to the EB curing of FRPs (CFRPs).

Furthermore, it is evident from Example 257 that the method of making FRPs (CFRPs) in accordance with the present invention may be applied not only to a lay-up process, but also to other FRP molding processes such as a filament winding process.

Molded Articles of CFRP and GFRP made According to the Present Invention

Basic properties of the CFRP and GFRP made in Examples 252 and 253 were measured, and the results are shown in Table 5. It can be seen from Table 5 that they were satisfactory samples.

What is claimed is:

1. A resin curing method wherein, when energy is applied to a resin composition from an external energy source in the form of radiation energy, an internal energy is autogeneously generated within the resin composition, so that the resin composition is cured by means of the autogeneously generated energy, or both the autogeneously generated energy and the energy from the external energy source, whether or not the resin composition contains a reinforcing material capable of screening the energy from the external energy source, said resin composition comprising a photopolymerization initiator composition comprising a photopolymerization initiator and a photo- and thermopolymerizaton initiator for initiating polymerization by means of both light and heat, wherein the photopolymerization initiator comprises at least one compound selected from the group consisting of a diazonium salt compound, an iodonium salt compound, a pyridinium salt compound, a phosphonium salt compound, a sulfonium salt compound, an iron-arene complex compound, and a sulfonate compound, and the photo- and thermopolymerization initiator comprises at least one of the sulfonium salts represented by the following formulae (III), (VI), or (VII):

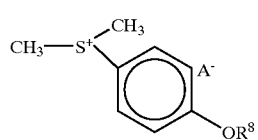
(III)

where $R^8$ represents a hydrogen atom, $CH_3CO$ or $CH_3OCO$, and A represents $SbF_6$, $PF_6$, $BF_4$, $AsF_6$ or $CH_3SO_4$;

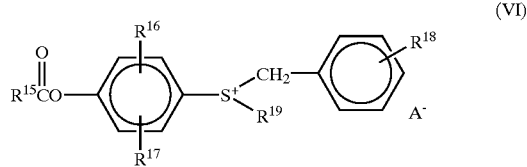
(VI)

where $R^{15}$ represents ethoxy, phenyl, phenoxy, benzyloxy, chloromethyl, dichloromethyl, trichloromethyl or trifluoromethyl, $R^{16}$ and $R^{17}$ each independently represents hydrogen, halogen or an alkyl group of 1 to 4 carbon atoms, $R^{18}$ represents hydrogen, methyl, methoxy or halogen, $R^{19}$ represents an alkyl group of 1 to 4 carbon atoms, and A represents $SbF_6$, $PF_6$, $BF_4$ or $AsF_6$;

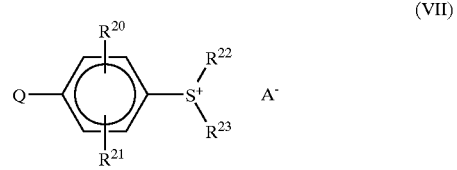
(VII)

where Q represents methoxycarbonyloxy, acetoxy, benzyloxycarbonyloxy or dimethylamino, $R^{20}$ and $R^{21}$ each independently represents hydrogen or an alkyl group of 1 to 4 carbon atoms, $R^{22}$ and $R^{23}$ each independently represents an alkyl group of 1 to 4 carbon atoms, and A represents $SbF_6$, $PF_6$, $AsF_6$ or $BF_4$.

2. A resin curing method according to claim 1, wherein, when external energy is applied to the resin composition, a first internal energy is autogeneously generated within the resin composition, and a second internal energy similar to the first internal energy is successively autogeneously generated by the first internal energy, so that the resin composition is cured by means of the first and second internal autogeneously generated energies, or both the first and second internal autogeneously generated energies and the external energy, whether or not the resin composition contains a reinforcing material capable of screening the energy from the external energy source.

3. A resin curing method according to claim 2, wherein the reinforcing material is selected from the group consisting of carbon, carbon fiber, metals, inorganic fillers, carbon-fiber-reinforced composite materials, carbon/metal/inorganic matter containing resins, and combinations thereof.

4. A resin curing method as claimed in claim 1, wherein said photopolymerization initiator composition generates at least one species selected from the group consisting of a cation, a radical and an anion during the curing process.

5. A resin curing method as claimed in claim 1, wherein the substance capable of screening the energy from the external energy source comprises a material selected from the group consisting of carbon, carbon fiber, metals, inorganic fillers, and mixtures thereof.

6. A resin curing method as claimed in claim 1, wherein the substance capable of screening the energy from the external energy source is a reinforcing material.

7. A resin curing method as claimed in claim 6, wherein the reinforcing material is a carbon fiber reinforcing material.

8. A resin curing method as claimed in claim 1, wherein the substance capable of screening the energy from the external energy source is a carbon cloth material.

9. A resin curing method according to claim 1, wherein the reinforcing material is selected from the group consisting of carbon, carbon fiber, metals, inorganic fillers, carbon-fiber-reinforced composite materials, carbon/metal/inorganic matter containing resins, and combinations thereof.

10. A method of making a molded article of a molding material, fiber-reinforced composite material, carbon fiber-reinforced composite material, or other composite material, a cured adhesive, sealer, varnish, paint or coating, or ink or toner, said method comprising the step of curing a resin as claimed in claim 1.

11. A photopolymerization initiator composition comprising at least one photopolymerization initiator, at least one photo- and thermopolymerization initiator for initiating polymerization by means of both light and heat, and at least one thermopolymerization initiator, wherein the photopolymerization initiator comprises at least one compound selected from the group consisting of a diazonium salt compound, an iodonium salt compound, a pyridinium salt compound, a phosphonium salt compound, a sulfonium salt compound, an iron-arene complex compound, and a sulfonate compound, and the photo- and thermopolymerization initiator comprises at least one of the sulfonium salts represented by the following formulae (III), (V), (VI) or (VII):

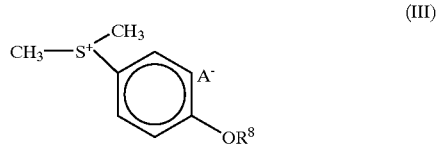
(III)

where $R^8$ represents a hydrogen atom, $CH_3CO$ or $CH_3OCO$, and A represents $SbF_6$, $PF_6$, $BF_4$, $AsF_6$ or $CH_3SO_4$;

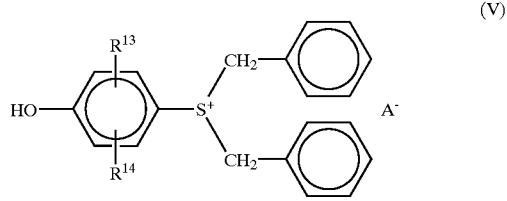
(V)

where $R^{13}$ and $R^{14}$ each independently represents hydrogen or an alkyl group of 1 to 4 carbon atoms, and A represents $SbF_6$, $PF_6$ or $AsF_6$;

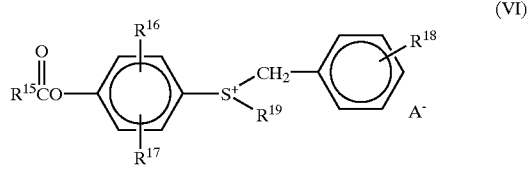
(VI)

where $R^{15}$ represents ethoxy, phenyl, phenoxy, benzyloxy, chloromethyl, dichloromethyl, trichloromethyl or trifluoromethyl, $R^{16}$ and $R^{17}$ each independently represents hydrogen, halogen or an alkyl group of 1 to 4 carbon atoms, $R^{18}$ represents hydrogen, methyl, methoxy or halogen, $R^{19}$ represents an alkyl group of 1 to 4 carbon atoms, and A represents $SbF_6$, $PF_6$, $BF_4$ or $AsF_6$;

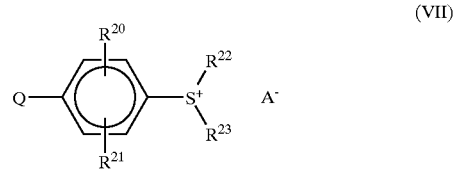
(VII)

where Q represents methoxycarbonyloxy, acetoxy, benzyloxycarbonyloxy or dimethylamino, $R^{20}$ and $R^{21}$ each independently represents hydrogen or an alkyl group of 1 to 4 carbon atoms, $R^{22}$ and $R^{23}$ each independently represents an alkyl group of 1 to 4 carbon atoms, and A represents $SbF_6$, $PF_6$, $AsF_6$ or $BF_4$; wherein the thermopolymerization initiator comprises at least one of the compounds represented by the following chemical formulae (VIII) and (IX):

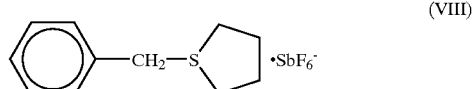
(VIII)

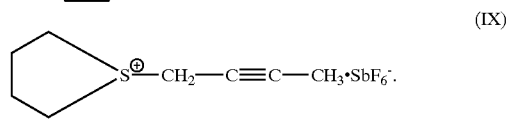
(IX)

12. A resin composition comprising the photopolymerization initiator composition as claimed in claim 11 and a photopolymerizable oligomer or photopolymerizable monomer.

13. A resin composition as claimed in claim 12 wherein the photopolymerizable oligomer is a cationic photopolymerizable epoxy oligomer and the photopolymerizable monomer is a cationic photopolymerizable epoxy monomer.

14. A resin composition as claimed in claim 13 wherein the photopolymerizable epoxy oligomer or photopolymerizable epoxy monomer is a photopolymerizable alicyclic epoxy oligomer or photopolymerizable alicyclic epoxy monomer.

15. A resin composition as claimed in claim 14 wherein the photopolymerizable alicyclic epoxy monomer is 3,4-epoxycyclohexylmethyl 3,4-epoxycyclohexanecarboxylate.

16. A resin composition as claimed in claim 12 which contains at least one radiation energy screening substance.

17. A resin composition as claimed in claim 12 which additionally contains at least one additive selected from the group consisting of photosensitizers, reactive diluents and photosensitive compounds.

18. A resin composition which contains a photopolymerization initiator composition as claimed in claim 11, and wherein, when the resin composition is exposed to external radiation energy an internal energy is autogenously generated within the resin composition, so that the resin composition is cured by means of the autogenously generated internal energy, or both the autogenously generated internal energy and the external radiation energy, whether or not the resin composition contains a substance capable of screening radiation energy, or wherein, when the resin composition is exposed to the external radiation energy, a first internal energy is autogeneously generated within the resin composition, and a second internal energy similar to the first internal energy is successively autogeneously generated by the first internal energy, so that the resin composition is cured by means of the first and second autogeneously generated internal energies, or both the first and second autogeneously generated internal energies and the external radiation energy, whether or not the resin composition contains a substance capable of screening radiation energy.

19. A resin composition as claimed in claim 18 which contains a photopolymerizable oligomer or photopolymerizable monomer and wherein the photopolymerization initiator composition is contained in an amount of 0.5 to 6.0 parts by weight per 100 parts by weight of the photopolymerizable oligomer or the photopolymerizable monomer, and the weight ratio of the photo- and thermopolymerization initiator to the photopolymerization initiator is in the range of 1 to 4.

20. A resin composition as claimed in claim 19 wherein the photopolymerizable oligomer or photopolymerizable monomer is a cationic photopolymerizable oligomer or cationic photopolymerizable monomer.

21. A method of making a molded article of a molding material, fiber-reinforced composite material, carbon fiber-reinforced composite material, or other composite material, a cured adhesive, sealer, varnish, paint or coating, or ink or toner, said method comprising the step of curing a resin composition containing a photopolymerization initiator as claimed in claim 11.

22. A method of making a fiber-reinforced composite material or carbon fiber-reinforced composite material as claimed in claim 21, said method comprising the step of utilizing at least one technique selected from the group consisting of hand lay-up, spray-up, filament winding, tape winding, roll winding, draw molding and continuous roll pressing to form the fiber-reinforced composite material or carbon fiber-reinforced composite material.

23. A method as claimed in claim 21 wherein the fibrous material is carbon fiber.

24. A resin composition comprising a photopolymerization initiator composition according to claim 11, a photopolymerization oligomer or photopolymerizable monomer, and a reinforcing material.

25. A resin composition according to claim 24, wherein the reinforcing material is selected from the group consisting of carbon, carbon fiber, metals, inorganic fillers, carbon-fiber-reinforced composite materials, carbon/metal/inorganic matter containing resins, and combinations thereof.

26. A method of making a molded article of a molding material, fiber-reinforced composite material, carbon fiber-reinforced composite material, or other composite material, a cured adhesive, sealer, varnish, paint or coating, or ink or toner, said method comprising the step of curing a resin composition containing a photopolymerization initiator composition as claimed in claim 12.

27. A method as claimed in claim 26 wherein the resin composition contains a photopolymerizable oligomer or photopolymerizable monomer and wherein the photopolymerization initiator composition is contained in an amount of 0.5 to 0.6 parts by weight per 100 parts by weight of said photopolymerizable oligomer or photopolymerizable monomer, and the weight ratio of the photo- and thermopolymerization initiator to the photopolymerization initiator is in the range of 1 to 4.

28. A method as claimed in claim 27 wherein the photopolymerizable oligomer or photopolymerizable monomer is a cationic photopolymerizable oligomer or cationic photopolymerizable monomer.

29. A method of making a prepreg which comprises impregnating a reinforcing fiber or a reinforcing fiber cloth material with a resin composition as claimed in claim 17.

30. A method of making a fiber-reinforced composite material wherein, when a stack of prepregs made by the method of claim 29 is exposed to external radiation energy, an internal energy is autogenously generated within the resin composition of the stack, so that the resin composition is cured by means of the autogenously generated internal energy, or both the autogenously generated internal energy and the external radiation energy, whether or not the resin composition contains a reinforcing material capable of screening radiation energy, or wherein, when the stack is exposed to the external radiation energy, a first internal energy is autogenously generated within the resin composition, and a second internal energy similar to the first internal energy is successively autogeneously generated by the first internal energy, so that the resin composition is cured by means of the first and second autogeneously generated internal energies, or both the first and second autogeneously generated internal energies and the external radiation energy, whether or not the resin composition contains a reinforcing material capable of screening radiation energy.

31. A method of repairing a fiber-reinforced composite material, building, structure or product which comprises attaching a prepreg made by the method of claim 29 to a part to be repaired of a fiber-reinforced composite material, building, structure or product, and curing the prepreg.

32. A method of reinforcing a fiber-reinforced composite material, building, structure or product which comprises attaching a prepreg made by the method of claim 29 to a part to be reinforced of a fiber-reinforced composite material, building, structure or product, and curing the prepreg.

33. A method of reinforcing a fiber-reinforced composite material, building, structure or product which comprises impregnating a reinforcing fiber or reinforcing fiber cloth material with a resin composition as claimed in claim 12, attaching the reinforcing fiber or reinforcing fiber cloth material to a part to be reinforced of a fiber-reinforced composite material, building, structure or product by spray-up or brushing, and curing the resin composition.

34. A fiber-reinforced composite material obtained by impregnating a three-dimensional textile with a resin composition as claimed in claim 12.

35. A repair material for filling a part to be repaired of a fiber-reinforced composite material, building, structure or product which contains a resin composition as claimed in claim 12.

36. A resin curing method which comprises applying energy from an external energy source to the resin composition as claimed in claim 12 to cure the resin.

37. A resin curing method as claimed in claim 36 wherein said resin composition is previously warmed in a temperature range which does not cause its cure.

38. A curable material selected from the group consisting of molding material, fiber-reinforced composite material, carbon fiber-reinforced composite material, other composite material, adhesive, sealer, varnish, ink, toner, and combinations thereof which contains a photopolymerization initiator composition comprising a photopolymerization initiator and a photo- and thermopolymerizaton initiator for initiating polymerization by means of both light and heat wherein the photopolymerization initiator comprises at least one compound selected from the group consisting of a diazonium salt compound, an iodonium salt compound, a pyridinium salt compound, a phosphonium salt compound, a sulfonium salt compound, an iron-arene complex compound, and a sulfonate compound, and the photo- and thermopolymerization initiator comprises at least one of the sulfonium salts represented by the following formula (IV):

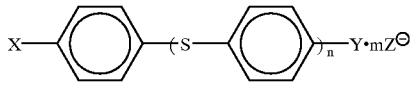
(IV)

where X represents a sulfonio group of the formula:

(a)

in which $R^9$ represents an aliphatic group of 1 to 18 carbon atoms, $R^{10}$ represents an aliphatic group of 1 to 18 carbon atoms or a substituted or unsubstituted aromatic group of 6 to 18 carbon atoms, and $R^9$ and $R^{10}$ may be joined together to form a ring;

Y represents a sulfonio group of the formula:

(b)

in which $R^{11}$ represents an aliphatic group of 1 to 18 carbon atoms, $R^{12}$ represents an aliphatic group of 1 to 18 carbon atoms or a substituted or unsubstituted aromatic group of 6 to 18 carbon atoms, and $R^{11}$ and $R^{12}$ may be joined together to form a ring, or Y represents a hydrogen atom, a halogen atom, a nitro group, an alkoxy group, an aliphatic group of 1 to 18 carbon atoms, or a substituted or unsubstituted phenyl, phenoxy or thiophenoxy group of 6 to 18 carbon atoms; n and m are each independently 1 or 2; and Z is an anion represented by the formula $MQ_{1(el)}$ or $MQ_{1(el)-1}OH$ in which M is B, P, As or Sb, Q is a halogen atom, and 1(el) is 4 or 6.

39. A resin composition comprising a photopolymerization initiator composition comprising a photopolymerization initiator and a photo- and thermopolymerization initiator for initiating polymerization by means of both light and heat, and a photopolymerizable oligomer or a photopolymerizable monomer, wherein the photopolymerization initiator comprises at least one sulfonium salt compound and the photo- and thermopolymerization initiator comprises at least one of the sulfonium salts represented by formula (I) or (II):

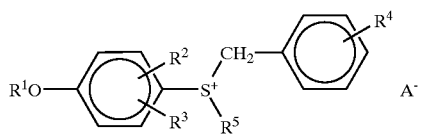
(I)

where $R^1$ represents hydrogen, methyl, acetyl or methoxycarbonyl, $R^2$ and $R^3$ each independently represents hydrogen, halogen or an alkyl group of 1 to 4 carbon atoms, $R^4$ represents hydrogen, halogen or methoxy, $R^5$ represents an alkyl group of 1–4 carbon atoms, and A represents $SbF_6$, $PF_6$, $AsF_6$ or $BF_4$;

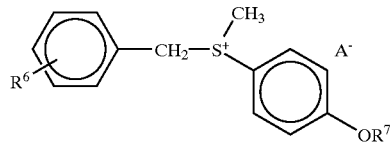
(II)

where $R^6$ represents a hydrogen atom, a halogen atom, a nitro group or a methyl group, $R^7$ represents a hydrogen atom, $CH_3CO$ or $CH_3OCO$, and A represents $SbF_6$, $PF_6$, $BF_4$ or $AsF_6$, and wherein the photopolymerization initiator composition is present in an amount of from 0.5 to 6.0 parts by weight per 100 parts by weight of the photopolymerizable oligomer or photopolymerizable monomer, and the weight ratio of the photo- and thermopolymerizable initiator to the photopolymerization initiator ranges from 1 to 4.

40. The resin composition according to claim 39, wherein at least one sulfonium salt represented by the formula (I), where $R^1$ is hydrogen, $R^2$ is hydrogen, $R^3$ is hydrogen, $R^4$ is hydrogen, and $R^5$ is methyl, is present.

41. The resin composition according to claim 39, wherein at least one sulfonium salt represented by the formula (II), where $R^6$ is hydrogen and $R^7$ is hydrogen, is present.

42. The resin composition according to claim 39, wherein at least one sulfonium salt represented by the formula (II), where $R^6$ is methyl and $R^7$ is hydrogen, is present.

43. A method of making a molded article of a molding material, fiber-reinforced composite material, carbon fiber-reinforced composite material, or other composite material, a cured adhesive, sealer, varnish, paint or coating, or ink or toner, said method comprising the step of curing a resin composition as claimed in claim 39.

44. The method according to claim 43, wherein at least one sulfonium salt represented by the formula (c), where $R^1$ is hydrogen , $R^2$ is hydrogen, $R^3$ is hydrogen, $R^4$ is hydrogen, and $R^5$ is methyl, is present.

45. The method according to claim 43, wherein at least one sulfonium salt represented by the formula (II), where $R^6$ is hydrogen and $R^7$ is hydrogen, is present.

46. The method according to claim 43, wherein at least one sulfonium salt represented by the formula (II), and wherein $R^6$ is methyl, and $R^7$ is hydrogen is represent.

47. A method of making a molded article of a molding material, fiber-reinforced composite material, carbon fiber-reinforced composite material, or other composite material, a cured adhesive, sealer, varnish, paint or coating, or ink or toner, said method comprising the step of curing a resin composition as claimed in claim 39.

48. The method according to claim 47, wherein at least one sulfonium salt represented by the formula (I), where $R^1$ is hydrogen, $R^2$ is hydrogen, $R^3$ is hydrogen, $R^4$ is hydrogen, and $R^5$ is methyl, is present.

49. The method according to claim 47, wherein at least one sulfonium salt represented by the formula (II), where $R^6$ is hydrogen and $R^7$ is hydrogen, is present.

50. The method according to claim 47, wherein at least one sulfonium salt represented by the formula (II), where $R^6$ is methyl and $R^7$ is hydrogen, is present.

51. A method of making a prepreg which comprises impregnating a reinforcing fiber or a reinforcing fiber cloth material with a resin composition as claimed in claim 39.

52. The method according to claim 51, wherein at least one sulfonium salt represented by the formula (I), where $R^1$ is hydrogen, $R^2$ is hydrogen, $R^3$ is hydrogen, $R^4$ is hydrogen, and $R^5$ is methyl, is present.

53. The method according to claim 51, wherein at least one sulfonium salt represented by the formula (II), where $R^6$ is hydrogen and $R^7$ is hydrogen, is present.

54. The method according to claim 51, wherein at least one sulfonium salt represented by the formula (II), where $R^6$ is methyl and $R^7$ is hydrogen, is present.

55. A method of reinforcing a fiber-reinforced composite material, building, structure or product which comprises providing a reinforcing fiber or reinforcing fiber cloth material impregnated with a resin composition as claimed in claim 39, attaching the reinforcing fiber or reinforcing fiber cloth material to a part to be reinforced of a fiber-reinforced composite material, building, structure or product by spray-up or brushing, and curing the resin composition.

56. The method according to claim 55, wherein at least one sulfonium salt represented by the formula (I), where $R^1$ is hydrogen, $R^2$ is hydrogen, $R^3$ is hydrogen, $R^4$ is hydrogen, and $R^5$ is methyl, is present.

57. The method according to claim 55, wherein at least one sulfonium salt represented by the formula (II), where $R^6$ is hydrogen, and $R^7$ is hydrogen, is present.

58. The method according to claim 55, wherein at least one sulfonium salt represented by the formula (II), where $R^6$ is methyl and $R^7$ is hydrogen, is present.

59. A resin curing method wherein, when energy is applied to a resin composition from an external energy source in the form of radiation energy, an internal energy is autogeneously generated within the resin composition, so that the resin composition is cured by means of the autogeneously generated internal energy, or both the autogeneously generated internal energy and the energy from the external energy source, whether or not the resin composition contains a reinforcing material capable of screening the energy from the external energy source, said resin composition comprising a photopolymerization initiator composition comprising a photopolymerization initiator and a photo- and thermopolymerization initiator for initiating polymerization by means of both light and heat, and a photopolymerizable oligomer or a photopolymerizable monomer, wherein the photopolymerization initiator comprises at least one sulfonium salt compound and the photo- and thermopolymerization initiator comprises at least one of the sulfonium salts represented by formula (I) or (II):

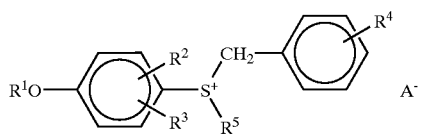

where $R^1$ represents hydrogen, methyl, acetyl or methoxycarbonyl, $R^2$ and $R^3$ each independently represents hydrogen, halogen or an alkyl group of 1 to 4 carbon atoms, $R^4$ represents hydrogen, halogen or methoxy, $R^5$ represents an alkyl group of 1 to 4 carbon atoms, and A represents $SbF_6$, $PF_6$, $AsF_6$ or $BF_4$;

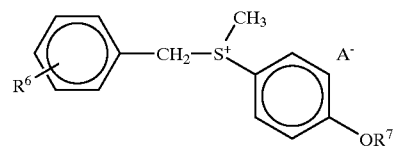

where $R^6$ represents a hydrogen atom, a halogen atom, a nitro group or a methyl group, $R^7$ represents a hydrogen atom, $CH_3CO$ or $CH_3OCO$, and A represents $SbF_6$, $PF_6$, $BF_4$ or $AsF_6$; and wherein the photopolymerization initiator composition is present in an amount of from 0.5 to 6.0 parts by weight per 100 parts by weight of the photopolymerizable oligomer or photopolymerizable monomer, and the weight ratio of the photo- and thermopolymerizable initiator to the photopolymerization initiator ranges from 1 to 4.

60. The method according to claim 59, wherein at least one sulfonium salt represented by the formula (I), where $R^1$ is hydrogen, $R^2$ is hydrogen, $R^3$ is hydrogen, $R^4$ is hydrogen, and $R^5$ is methyl, is present.

61. The method according to claim 59, wherein at least one sulfonium salt represented by the formula (II), where $R^6$ is hydrogen and $R^7$ is hydrogen, is present.

62. The method according to claim 59, wherein at least one sulfonium salt represented by the formula (II), where $R^6$ is methyl and $R^7$ is hydrogen, is present.

63. A resin composition comprising a photopolymerization initiator composition comprising a photopolymerization initiator and a photo- and thermopolymerization initiator for initiating polymerization by means of both light and heat, and a photopolymerizable oligomer or a photopolymerizable monomer, wherein the photopolymerization initiator composition comprises at least one sulfonium salt compound and the photo- and thermopolymerization initiator comprises at least one of the sulfonium salts represented by formula (II'):

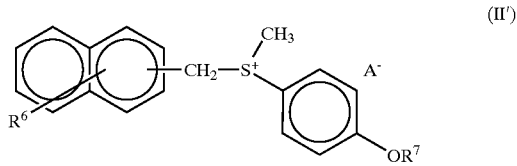

where $R^6$ represents a hydrogen atom, a halogen atom, a nitro group or a methyl group, $R^7$ represents a hydrogen atom, $CH_3CO$ or $CH_3OCO$, and A represents $SbF_6$, $PF_6$, $BF_4$ or $AsF_6$; and wherein the photopolymerization initiator composition is present in an amount of from 0.5 to 6.0 parts by weight per 100 parts by weight of the photopolymerizable oligomer or photopolymerizable monomer, and the weight ratio of the photo- and thermopolymerizable initiator to the photopolymerization initiator ranges from 1 to 4.

64. The resin composition according to claim 63, wherein at least one sulfonium salt represented by the formula (II'), where $R^6$ is hydrogen and $R^7$ is methyl, is present.

65. The resin composition according to claim 63, wherein at least one sulfonium salt represented by the formula (II'), wherein $R^6$ is hydrogen and $R^7$ is hydrogen, is present.

66. A method of making a molded article of a molding material, fiber-reinforced composite material, carbon fiber-reinforced composite material, or other composite material, a cured adhesive, sealer, varnish, paint or coating, or ink or toner, said method comprising the step of curing a resin composition as claimed in claim 63.

67. The method according to claim 66, wherein at least one sulfonium salt represented by the formula (II'), where $R^6$ is hydrogen and $R^7$ is methyl, is present.

68. The method according to claim 66, wherein at least one sulfonium salt represented by the formula (II'), where $R^6$ is hydrogen and $R^7$ is hydrogen, is present.

69. A method of making a molded article of a molding material, fiber-reinforced composite material, carbon fiber-reinforced composite material, or other composite material, a cured adhesive, sealer, varnish, paint or coating, or ink or toner, said method comprising the steps of curing a resin composition as claimed in claim 63.

70. The method according to claim 69, wherein at least one sulfonium salt represented by the formula (II'), where $R^6$ is hydrogen and $R^7$ is methyl, is present.

71. The method according to claim 69, wherein at least one sulfonium salt represented by the formula (II'), where $R^6$ is hydrogen and $R^7$ is hydrogen, is present.

72. A method of making a prepreg which comprises impregnating a reinforcing fiber or a reinforcing fiber cloth material with a resin composition as claimed in claim 63.

73. The method according to claim 72, wherein at least one sulfonium salt represented by the formula (II'), where $R^6$ is hydrogen and $R^7$ is methyl, is present.

74. The method according to claim 72, wherein at least one sulfonium salt represented by the formula (II'), where $R^6$ is hydrogen and $R^7$ is hydrogen, is present.

75. A method of reinforcing a fiber-reinforced composite material, building, structure or product which comprises providing a reinforcing fiber or reinforcing fiber cloth material impregnated with a resin composition as claimed in claim 63, attaching the reinforcing fiber or reinforcing fiber cloth material to a part to be reinforced of a fiber-reinforced composite material, building, structure or product by spray-up or brushing, and curing the resin composition.

76. The method according to claim 75, wherein at least one sulfonium salt represented by the formula (II'), where $R^6$ is hydrogen and $R^7$ is methyl, is present.

77. The method according to claim 75, wherein at least one sulfonium salt represented by the formula (II'), where $R^6$ is hydrogen and $R^7$ is hydrogen, is present.

78. A resin curing method wherein, when energy is applied to a resin composition from an external energy source in the form of radiation energy, an internal energy is autogeneously generated within the resin composition, so that the resin composition is cured by means of the autogeneously generated internal energy, or both the autogeneously generated internal energy and the energy from the external energy source, whether or not the resin composition contains a reinforcing material capable of screening the energy from the external energy source, said resin composition comprising a photopolymerization initiator composition comprising a photopolymerization initiator and a photo- and thermopolymerization initiator for initiating polymerization by means of both light and heat, and a photopolymerizable oligomer or a photopolymerizable monomer, wherein the photopolymerization initiator comprises at least one sulfonium salt compound and the photo- and thermopolymerization initiator comprises at least one of the sulfonium salts represented by formula (II'):

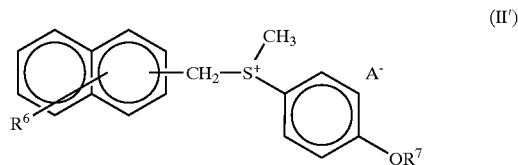

where $R^6$ represents a hydrogen atom, a halogen atom, a nitro group or a methyl group, $R^7$ represents a hydrogen atom, $CH_3CO$ or $CH_3OCO$, and A represents $SbF_6$, $PF_6$, $BF_4$ or $AsF_6$; and wherein the photopolymerization initiator composition is present in an amount of from 0.5 to 6.0 parts by weight per 100 parts by weight of the photopolymerizable oligomer or photopolymerizable monomer, and the weight ratio of the photo- and thermopolymerizable initiator to the photopolymerization initiator ranges from 1 to 4.

79. The method according to claim 78, wherein at least one sulfonium salt represented by the formula (II'), where $R^6$ is hydrogen and $R^7$ is methyl, is present.

80. The method according to claim 78, wherein at least one sulfonium salt represented by the formula (II'), where $R^6$ is hydrogen and $R^7$ is hydrogen, is present.

* * * * *

UNITED STATES PATENT AND TRADEMARK OFFICE
CERTIFICATE OF CORRECTION

PATENT NO. : 6,599,954 B1
DATED : July 29, 2003
INVENTOR(S) : Hayashi et al.

It is certified that error appears in the above-identified patent and that said Letters Patent is hereby corrected as shown below:

Title page,
Item [56], References Cited, U.S. PATENT DOCUMENTS, insert:
-- 4,374,066   2/1983      Crivello et al.
   5,247,113   9/1993      Roth et al.
   5,747,599   5/1998      Ohnishi --

Column 43,
Line 67, should read -- material with a resin composition as claimed in claim 12. --

Column 46,
Line 34, should read -- one sulfonium salt represented by the formula (I), where $R^1$ --

Signed and Sealed this

Sixteenth Day of December, 2003

JAMES E. ROGAN
*Director of the United States Patent and Trademark Office*